(12) United States Patent
Sousek et al.

(10) Patent No.: US 10,859,755 B2
(45) Date of Patent: Dec. 8, 2020

(54) LIGHT-GUIDING OPTICAL UNIT AND A LIGHT-GUIDING OPTICAL SYSTEM COMPRISING THE LIGHT-GUIDING OPTICAL UNITS

(71) Applicant: Varroc Lighting Systems, s.r.o., Senov u Noveho Jicina (CZ)

(72) Inventors: Pavel Sousek, Novy Jicin (CZ); David Najdek, Frydek-Mistek (CZ)

(73) Assignee: Varroc Lighting Systems, S.R.O., Senov u Noveho (CZ)

( * ) Notice: Subject to any disclaimer, the term of this patent is extended or adjusted under 35 U.S.C. 154(b) by 0 days.

(21) Appl. No.: 16/526,545

(22) Filed: Jul. 30, 2019

(65) Prior Publication Data
US 2020/0041716 A1 Feb. 6, 2020

(30) Foreign Application Priority Data
Aug. 3, 2018 (CZ) .............................. PV 2018-392

(51) Int. Cl.
*F21V 8/00* (2006.01)
*F21S 41/24* (2018.01)
(Continued)

(52) U.S. Cl.
CPC ............ *G02B 6/0055* (2013.01); *F21S 41/24* (2018.01); *F21S 43/239* (2018.01); *F21S 43/243* (2018.01); *F21S 43/247* (2018.01); *G02B 6/003* (2013.01)

(58) Field of Classification Search
CPC .. G02B 6/0013; G02B 6/0018; G02B 6/0023; G02B 6/0028; G02B 6/003; F21S 41/24; F21S 43/239; F21S 43/243; F21S 43/247
See application file for complete search history.

(56) References Cited

U.S. PATENT DOCUMENTS 5,390,085 A * 2/1995 Mari-Roca ........... G02B 6/0018
362/23.15
5,414,598 A * 5/1995 Anderson ............ G02B 6/0001
362/23.15
(Continued)

FOREIGN PATENT DOCUMENTS

CZ 306888 B6 8/2017
CZ 2017-338 A3 8/2018
(Continued)

OTHER PUBLICATIONS

Search Report dated May 13, 2019 from Corresponding Czech Application No. PV 2018-392 (3 pages).

*Primary Examiner* — Ismael Negron
*Assistant Examiner* — Christopher E Dunay
(74) *Attorney, Agent, or Firm* — Hovey Williams LLP

(57) ABSTRACT

The light-guiding optical unit comprising a light guide made of an optically transparent material having the shape of a plate with top and bottom surfaces, a light unit to emit light rays, and a collimating element comprising the first reflective surface configured to reflect light rays that fall onto it in the direction (A1, A2) towards the light guide output surface. The top or bottom surface of the light guide has a recess whose surface comprises second and third reflective surfaces, which are configured to reflect light rays falling onto them to respective lateral reflective surfaces that are part of the surface of the light guide. A recess is situated between the first reflective surface and the output surface in such a way that a part of the light rays reflected from the first reflective surface pass through this recess after this reflection before falling onto the output surface.

13 Claims, 24 Drawing Sheets

(51) Int. Cl.
*F21S 43/247* (2018.01)
*F21S 43/239* (2018.01)
*F21S 43/243* (2018.01)

(56) References Cited

U.S. PATENT DOCUMENTS

| | | | |
|---|---|---|---|
| 6,139,163 A * | 10/2000 | Satoh | G02B 6/0018 |
| | | | 362/298 |
| 7,322,729 B2 | 1/2008 | Nagabuchi | |
| 9,110,199 B2 * | 8/2015 | Fang | G02B 6/002 |
| 9,574,734 B2 | 2/2017 | Sousek et al. | |
| 2007/0145395 A1 | 6/2007 | Liu et al. | |
| 2007/0274100 A1 * | 11/2007 | Yang | G02B 6/0018 |
| | | | 362/615 |
| 2008/0239203 A1 * | 10/2008 | Teijido | G02B 6/0018 |
| | | | 349/65 |
| 2012/0188774 A1 | 7/2012 | Okada | |
| 2012/0218772 A1 | 8/2012 | Mitsuhashi et al. | |
| 2015/0003092 A1 | 1/2015 | Gebauer | |
| 2015/0267895 A1 | 9/2015 | Kono | |
| 2015/0316703 A1 * | 11/2015 | de Sugny | G02B 6/0031 |
| | | | 362/610 |
| 2016/0230949 A1 * | 8/2016 | de Lamberterie | F21S 41/322 |
| 2018/0356582 A1 | 12/2018 | Sousek et al. | |

FOREIGN PATENT DOCUMENTS

| | | |
|---|---|---|
| EP | 2450725 A1 | 5/2012 |
| EP | 2607774 A2 | 6/2013 |
| FR | 2966224 B1 | 12/2012 |
| FR | 3026816 A1 | 4/2016 |

* cited by examiner

LIGHT-GUIDING OPTICAL UNIT AND A LIGHT-GUIDING OPTICAL SYSTEM COMPRISING THE LIGHT-GUIDING OPTICAL UNITS

RELATED APPLICATIONS

This application claims the priority benefit of Czech Patent Application Serial No. PV2018-392 entitled "A light-guiding optical unit and a light-guiding optical system comprising the light-guiding optical units", filed Aug. 3, 2018, the entire disclosure of which is incorporated herein by reference.

FIELD OF THE INVENTION

The invention relates to a light-guiding optical unit that comprises a planarly shaped light guide and a collimating element to conduct light emitted by a light source, especially to be used for a light device of a vehicle. The invention also relates to a light-guiding system comprising the light-guiding optical units.

BACKGROUND INFORMATION

A common drawback of known light guides used for light devices of motor vehicles is the fact that a certain part of the light emitted by the light sources is not used or that the arrangement of individual components of the light device does not support efficient use of the emitted light, which reduces the light efficiency of the light guide. Thus, in the field of the design of light guides and light-guiding systems, there is a permanent effort to propose such designs that will bring an increase of their light efficiency and ensure homogeneity of the output light beam. Within the structural design of a light device, great emphasis is placed on the quantity of light sources. This is because a high number of light sources, especially LED sources, entails not only higher financial costs but also higher requirements for the electronic equipment of the light device, and thus increased production costs of the light device.

High quantity of light sources can be eliminated through a modification of the design of the optical concept. E.g. the documents FR296622461, US20150267895A1, CZ20170338A1 describe light-guiding optical systems that strive to efficiently use the light emitted by the light sources by means of a light-guiding body made of an optically transparent material. The light-guiding body comprises an associated collimating element that is used to efficiently direct light during binding of light rays from the light source already. The collimated light rays are then sent to an internal reflective means that comprises surfaces configured for total reflection of at least a part of incident light rays while at least a part of light rays reflected this way is directed to the required direction by means of total reflection. The reflective surfaces of the reflective means are frequently designed as planar and inclined by 45° with respect to the direction of the light rays while two adjacent surfaces diverge from a common contact edge or contact point. The quantity of contact edges and points corresponds to the quantity of reflective surfaces and their mutual spatial arrangement.

Other light-guiding optical systems described, e.g. in the documents U.S. Pat. No. 7,322,729B2, US20150003092A1, US20070145395A1, FR3026816A1, EP2607774A2 are equipped with a planarly shaped light-guiding body that comprises at least one planar input surface through which light rays enter the internal structure of the light-guiding body, the light-guiding body being further equipped with a central recess wherein at least one surface of the central recess is configured to reflect bound light rays and to send them to the required direction. The reflective surfaces of the central recess are frequently designed as parabolic ones. Some light-guiding bodies are even fitted with a rotary parabolic surface wherein the reflective surface of the parabolic shape opens from one point. Light emitted from the light source is first slightly refracted on the planar input surface depending on the angle of incidence, subsequently the light rays are guided to the internal structure of the light guide where they fall on at least one primary, parabolically shaped reflective surface for collimation of light rays, i.e. for parallel propagation of individual light rays in the inner structure of the light guide. In some propagation directions of light rays, secondary reflective surfaces are situated that are configured for total reflection of collimated light rays. These surfaces are generally part of the outer edges of the light guide. In some propagation directions of light rays, inner recesses with internal input and output surfaces are situated. The inner output surfaces of these recesses can also be used to direct or deflect light rays to the required direction. Light rays first exit from the internal structure of the light guide, the exit direction of the light rays being given by the shape of the inner output surface. The light rays diffuse through the free spaces while they are re-bound to the internal structure of the light guide by means of the inner input surface. A drawback of these light-guiding optical systems is spatial complexity of the light-guiding body and its manufacturability, which entails increased financial and engineering requirements for the production. For instance, facilitation of removal of the optical element from the production mold, deformation of some parts of the optical element during cooling of the plastic molding, etc., must be taken into account.

The aim of the present invention is to solve the issue of increasing the light efficiency of the light-guiding optical unit without a large number of light sources having to be used to ensure the required light characteristic. Therefore, it is an object of the invention to propose a light-guiding optical unit that makes it possible to fulfill the required light function, including high light efficiency and even distribution of the light intensity on the output surface with the use of a relatively low number of light sources. Another object is to make sure that the light-guiding optical unit is adaptable to requirements resulting from the structural, engineering and optical design of the lighting device.

SUMMARY OF THE INVENTION

The above-mentioned objects of the invention are fulfilled by a light-guiding optical unit according to the invention comprising a light guide made of an optically transparent material having the shape of a plate with a top surface and a bottom surface, a light unit to emit light rays and a collimating element comprising the first reflective surface configured to reflect light rays that fall onto it towards the output surface of the light guide. The top surface or the bottom surface of the light guide is equipped with a recess whose surface comprises the second reflective surface and the third reflective surface that are configured to reflect light rays falling onto them to the respective lateral reflective surfaces, which are part of the light guide surface and are configured to reflect light rays further to the light guide in the direction towards the output surface. The recess is located between the first reflective surface and the output surface in such a way that a part of light rays reflected from the first reflective surface will pass through this recess after the reflection before falling onto the output surface.

In one of the embodiments, the first reflective surface comprises the first collimating region and the second collimating region wherein the first collimating region is configured to reflect light rays falling onto it in the first direction in such a way that the path of these light rays from the first reflective surface to the output surface does not pass through the recess, and the second collimating region is configured to reflect light rays falling onto it in the second direction in such a way that the path of these light rays from the first reflective surface to the output surface passes through the recess, the first direction being parallel to the second direction.

In another one of the embodiments, the optical axis of the light unit lies outside the said recess.

In another one of the embodiments, the surface of the recess comprises the second reflective surface and the third reflective surface that open from a common contact line comprising the deepest place of the recess, and are configured to reflect light rays falling onto them, sent directly from the binding surface of the light guide, to the respective lateral directions to the respective lateral reflective surfaces.

In another one of the embodiment, the surface of the recess comprises an inner output surface configured for the entry of light rays into the recess and thus temporary exit of these rays from the light guide at the same time, and an inner binding surface configured for the re-entry of light rays from the recess to the light guide.

In another one of the embodiments, the second reflective surface, the third reflective surface, the inner output surface and the inner binding surface define the said recess together.

The optical axis of the light unit can pass through the first reflective surface.

In another one of the embodiments, the first reflective surface, the second reflective surface and the third reflective surface have the shape of approximate paraboloids, while the light source or sources of the light unit lie approximately in the focal points of these paraboloids situated at the same point.

In another one of the embodiments, the optical axis of the light unit is approximately perpendicular to the direction of light rays reflected from the first reflective surface.

The collimating element and light guide can form an integral plastic molding.

In another one of the embodiments, the light-guiding optical unit is symmetrical with respect to the plane of symmetry perpendicular to the top surface and bottom surface of the light guide and passing through the longitudinal axis of the light guide. The said connecting line can lie on the plane of symmetry.

The invention also relates to a light-guiding optical system comprising two or more optical units according to the present invention, whose light guides are situated next to each other and form one integral molding together to create a continuous composite output surface comprising the output surfaces of individual light guides positioned next to each other, for the output of light rays from the light-guiding optical system.

BRIEF DESCRIPTION OF THE DRAWINGS

The present invention will be further clarified in more detail with the use of embodiment (implementation) examples of the invention, referring to the enclosed drawings where.

EXAMPLES OF EMBODIMENTS OF THE INVENTION

Figure 1:
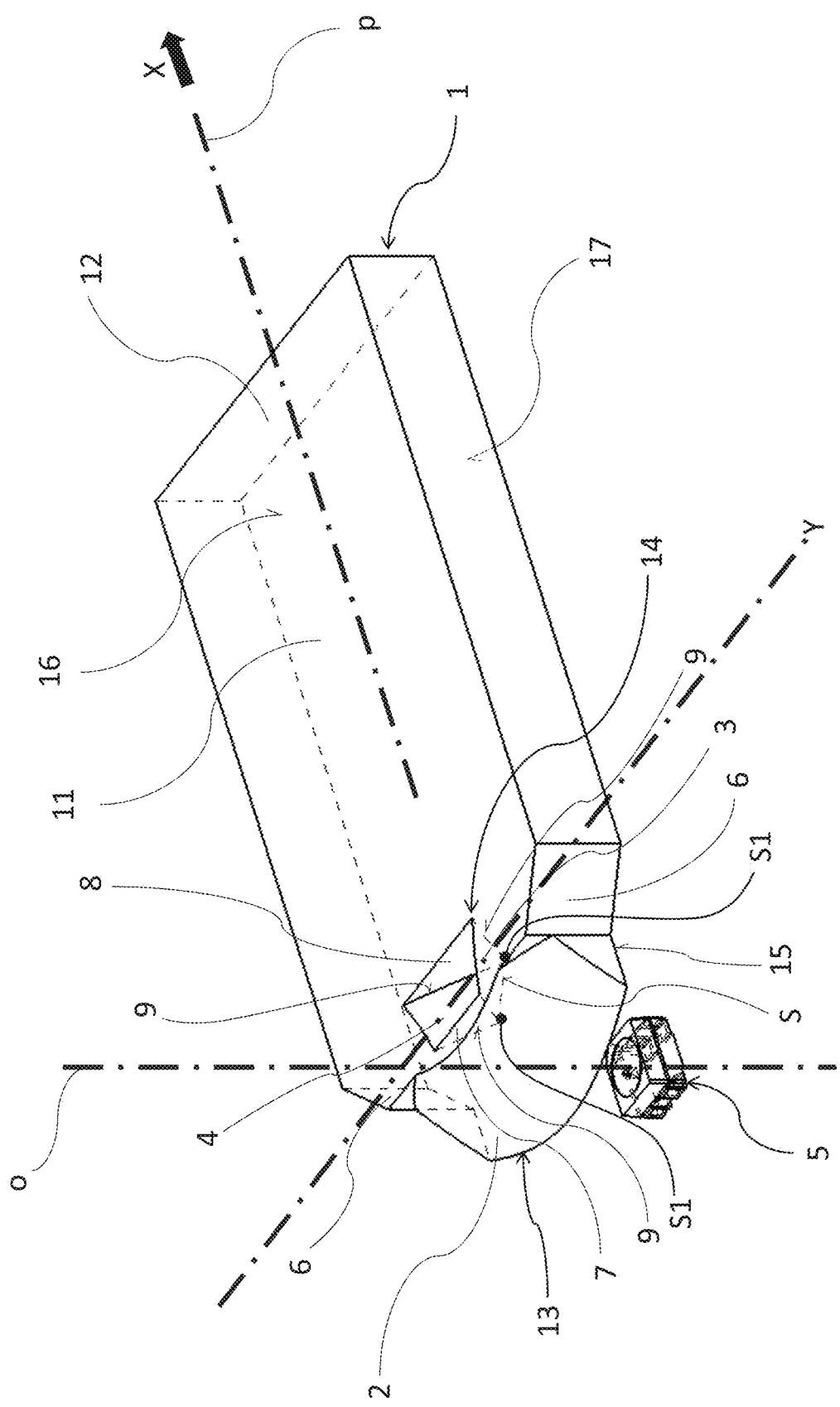
FIG. 1 shows a perspective top view of an embodiment example of a light-guiding optical unit according to the invention.
Figure 2:
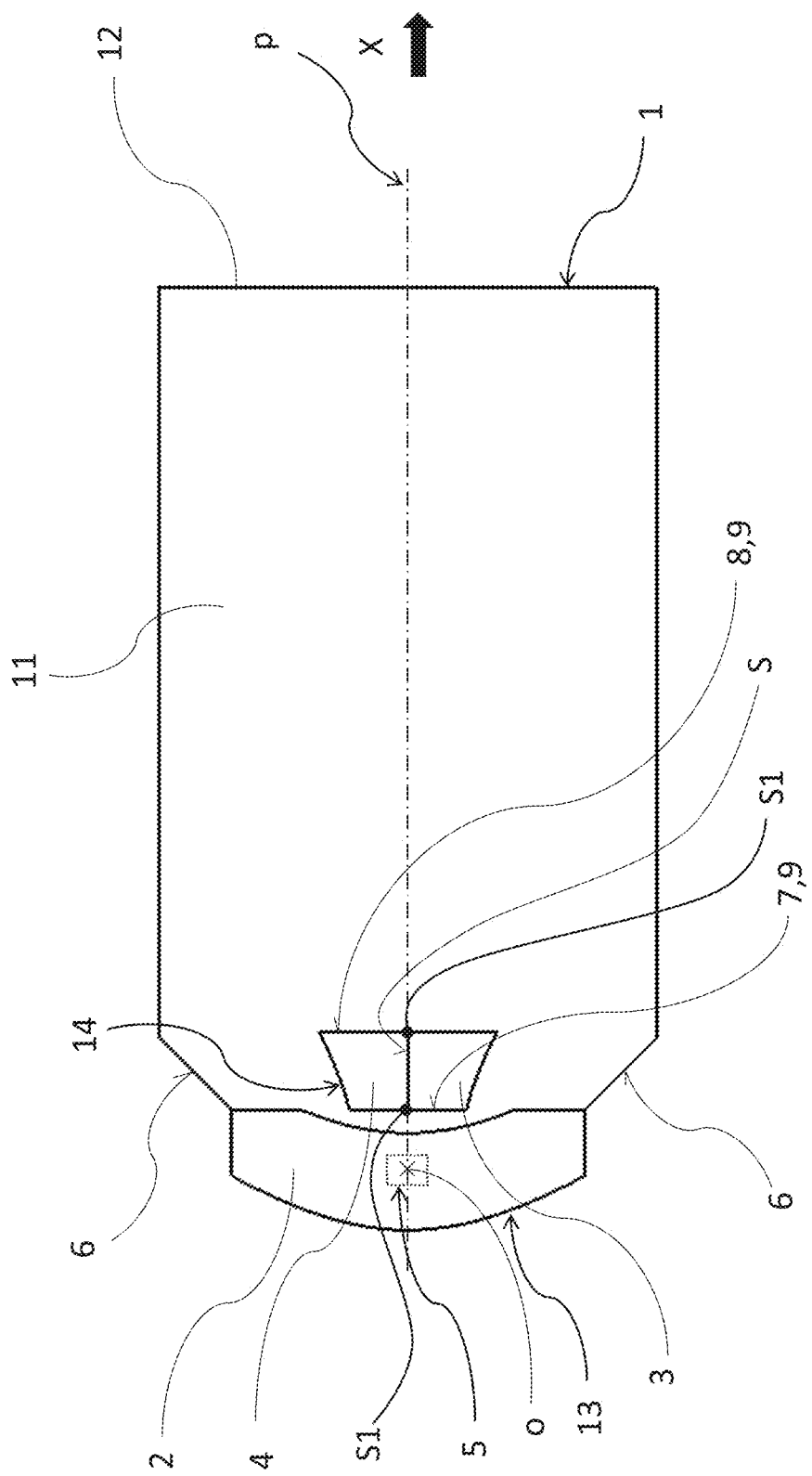
FIG. 2 shows a top view of the light-guiding optical unit of FIG. 1.
Figure 3:
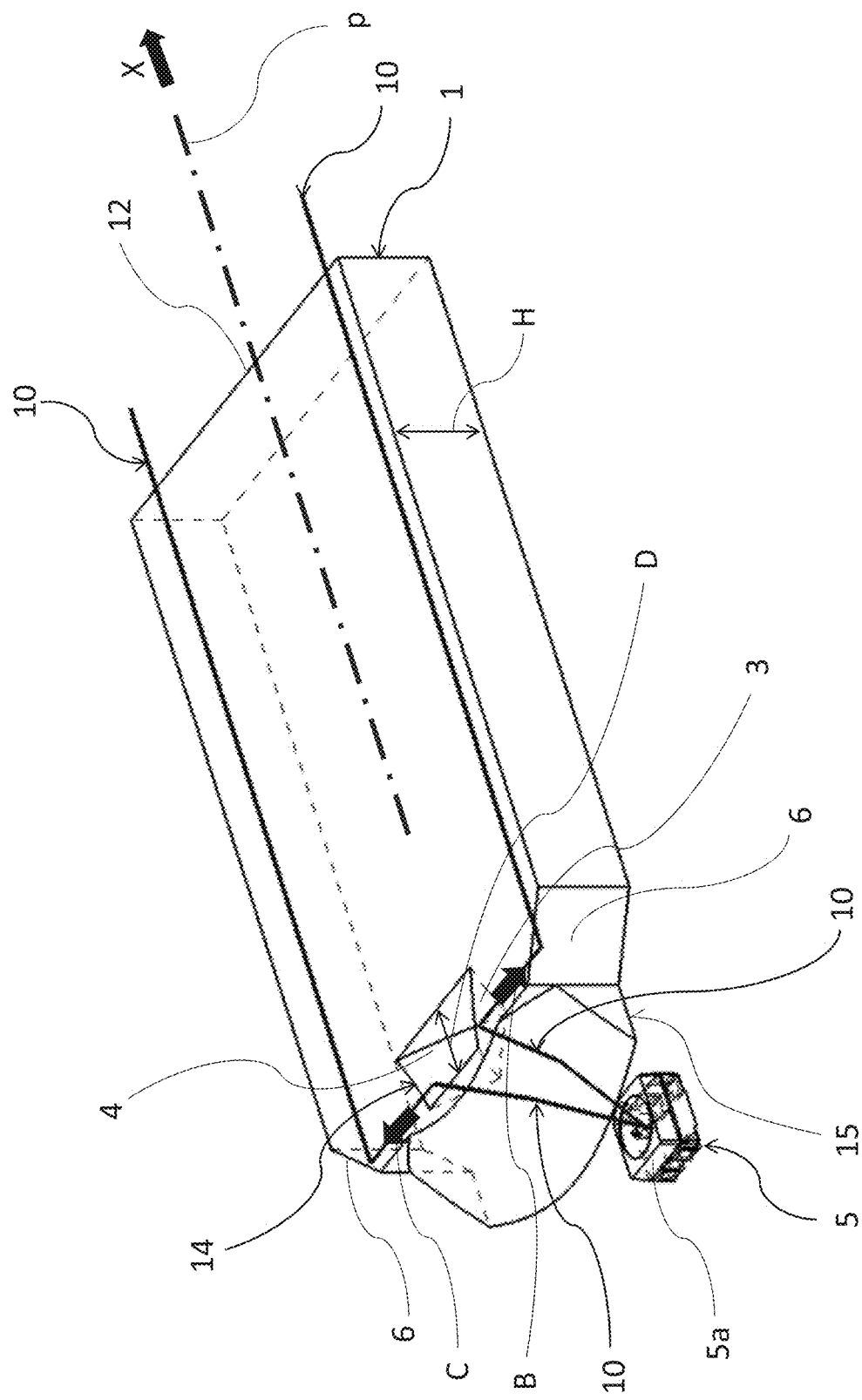
FIG. 3 shows the light-guiding optical unit of FIG. 1, indicating an example of paths of two light rays from the first part of light rays.
Figure 4:
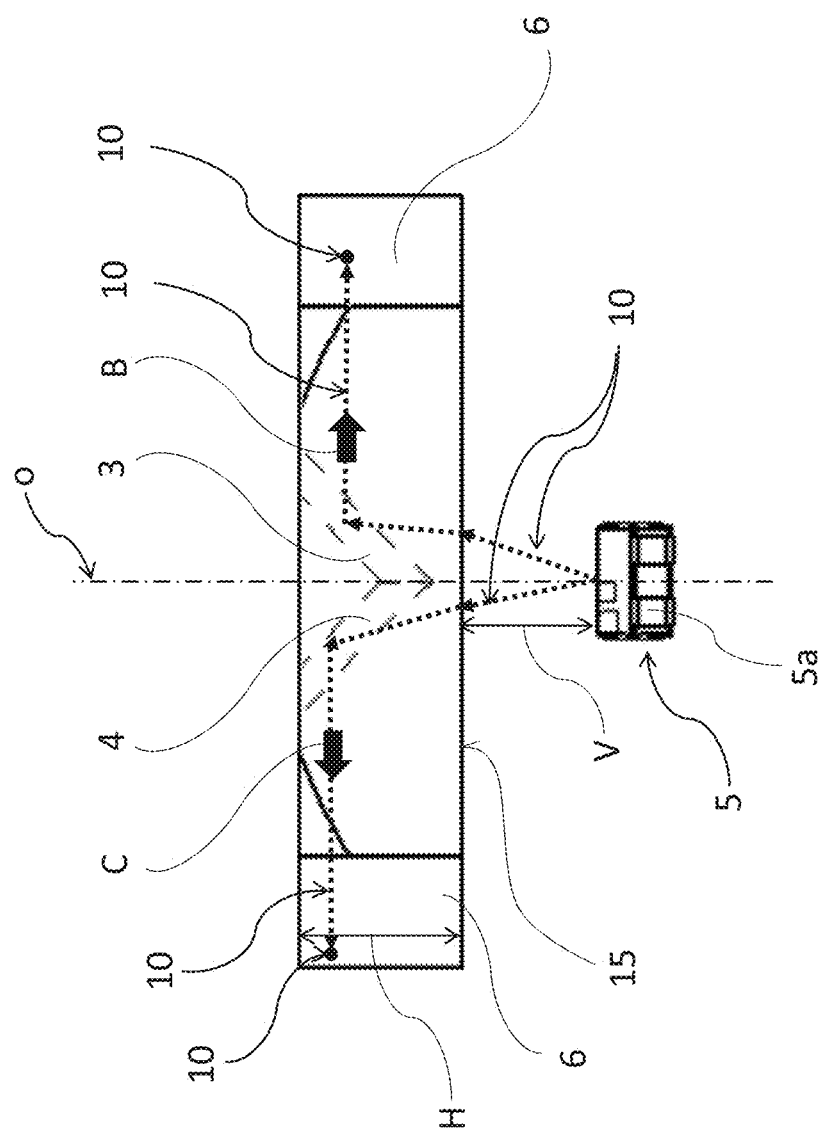
FIG. 4 shows a view of the rear side of the light-guiding optical unit of FIG. 1, indicating an example of the path of a light ray from the first part of light rays.

FIGS. 1 to 16 show the first embodiment example of the light-guiding optical unit according to the present invention, that comprises a collimating element 13 which is integral with the light guide 1 in this embodiment. The light guide has the shape of a plate 11 that has a top surface 16 and opposite bottom surface 17 mutually connected with the front surface, which is at least partly formed by the output surface 12 and lies at the opposite end of the light guide 1 with respect to the first reflective surface 2 of the collimating element 13. The "top" surface 16 refers to the surface that is visible in FIG. 1 whereas the "bottom" surface 17 is not directly visible in FIG. 1. The expressions "top" and "bottom" are not related to the actual position in which the light guide 1 is situated in its application.

The collimating element 13 advantageously forms one plastic molding with the light guide 1 as in the present embodiment, however an embodiment where the light guide 1 and collimating element 13 are represented by two bodies is also conceivable, while these bodies can also be spatially separated from each other. The light-guiding plate 11 comprises a central recess 14 while the said recess 14 is part of the said top surface 16 of the light guide 1 plate 11 in the illustrated embodiment. The central recess 14 could naturally be alternatively created on the bottom surface 17. The light unit 5 is situated against the binding surface 15, which is situated at the opposite side of the light guide 1 with respect to the recess 14. The binding surface 15 is configured for binding/entry of light rays 10 emitted by the light unit 5.

The light unit 5 has its optical axis o and advantageously comprises one light source 5a. The light unit 5 may also comprise more light sources 5a (see schematically FIG. 19) situated adjacent to each other. If the light unit 5 comprises one light source 5a the optical axis o of the light unit 5 refers to the optical axis of the light source 5a, i.e axis of the main beam of light rays 10 emitted by this light source 5a. If the light unit 5 comprises multiple light sources 5a situated next to each other (see e.g. FIG. 19), these light sources 5a are configured in such a way that the main light beams of the light sources 5a form a common main light beam whose axis o defines the optical axis o of the light unit 5.

In the embodiment shown in FIGS. 1 to 16, the optical axis o of the light unit 5 (no matter whether the light unit 5 comprises one or more adjacent light sources 5a) does not pass through the said recess 14, i.e. it passes outside it, in particular it passes through the first reflective surface 2.

In the illustrated embodiments, the light unit 5 is situated near the binding surface 15 and at a distance from this binding surface 15, however, such embodiments can be considered where the light unit 5 will be integral with the collimating element 13.

The surface of the recess 14 comprises the second reflective surface 3 and the third reflective surface 4 opening from a common connecting line S. The connecting line S comprises the lowest place of the recess 14 wherein in some embodiments, it may be parallel to the longitudinal axis p of the light guide 1, in other embodiments it is not parallel to the longitudinal axis p (this is e.g. the case of the embodiments of FIGS. 1 to 16). Further, the surface of the recess 14 comprises the inner output surface 7 and the inner binding surface 8, which are connected to the reflective surfaces 3, 4 along laterally situated connecting lines 9 originating in a common contact point S1 together with the connecting line S.

The inner output surface 7 and the inner binding surface 8 are preferably perpendicular to the direction A2 of light rays 10, which are reflected from the first reflective surface 2 in this direction and fall onto the inner output surface 7, exiting through it from the recess 14, as it will be explained in detail below. Due to the said perpendicularity, light rays 10 are not refracted when the rays 10 pass through the surfaces 7 and 8. However, in some embodiments (e.g. FIG. 20), the inner output surface 7 and the inner binding surface 8 are not perpendicular to the direction A2 which means that in this case, light rays 10 are refracted when the rays 10 pass through the surfaces 7 and 8.

The light guide may, but in other embodiments may not, be symmetrical with respect to the place of symmetry perpendicular to the bottom surface of the light guide 1 and passing through the longitudinal axis p of the light guide 1 as is the case, e.g., in the embodiments of FIGS. 1 to 16.

Figure 24:
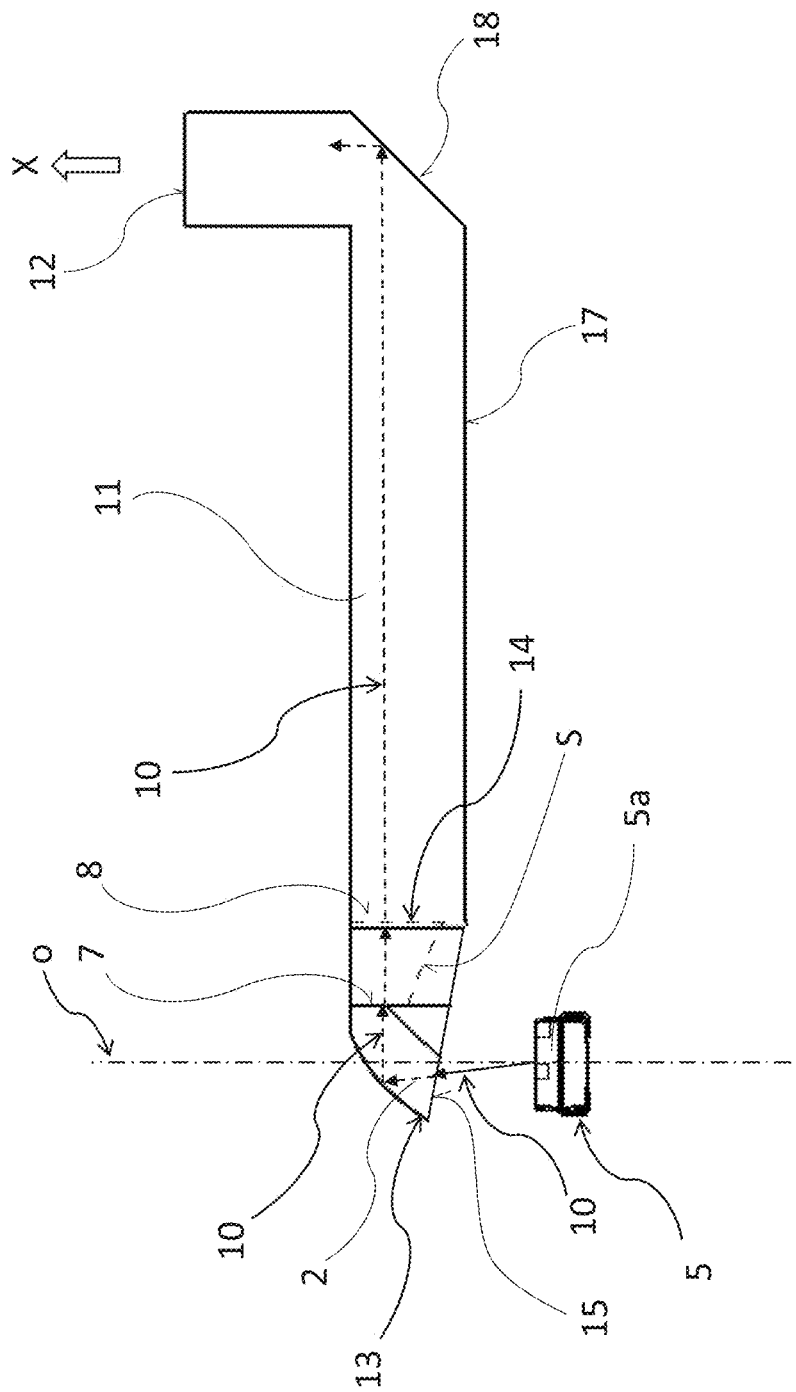
FIG. 24 shows a side view of still another embodiment example of a light-guiding optical unit.

Beams of light rays 10 of the light-guiding optical unit can exit from the output surface 12 in the direction of the optical axis x of the light-guiding optical unit 10, which is parallel to the longitudinal axis p of the light guide 1 as, e.g., in the embodiment of FIGS. 1 to 16. FIG. 24 then shows another example wherein the optical axis X is parallel to the optical axis o of the light unit 5.

Now, the path of light rays 10 will be discussed in detail with reference to the drawings. As mentioned above, the light unit 5 may comprise one or more light sources 5a. Light rays 10 emitted from the light sources of the light unit 5 are bound to the inner structure of the light guide 1 by means of an advantageously planar binding surface 15. The light rays 10 that finally exit from the output surface 12 of the light guide 1 can be divided into four parts, which will be described below.

Figure 5:
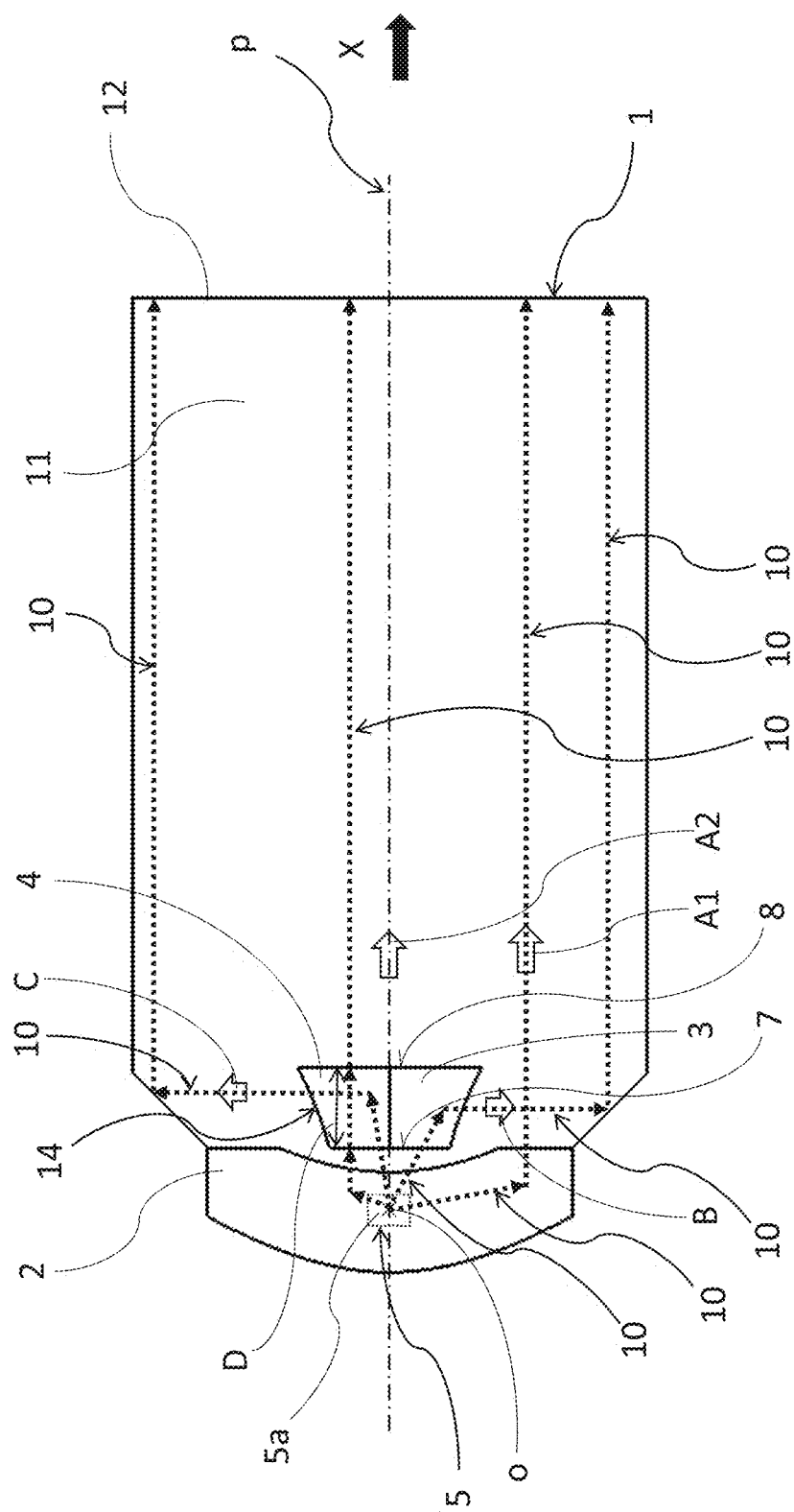
FIG. 5 shows a top view of the light-guiding optical unit of FIG. 4.
Figure 6:
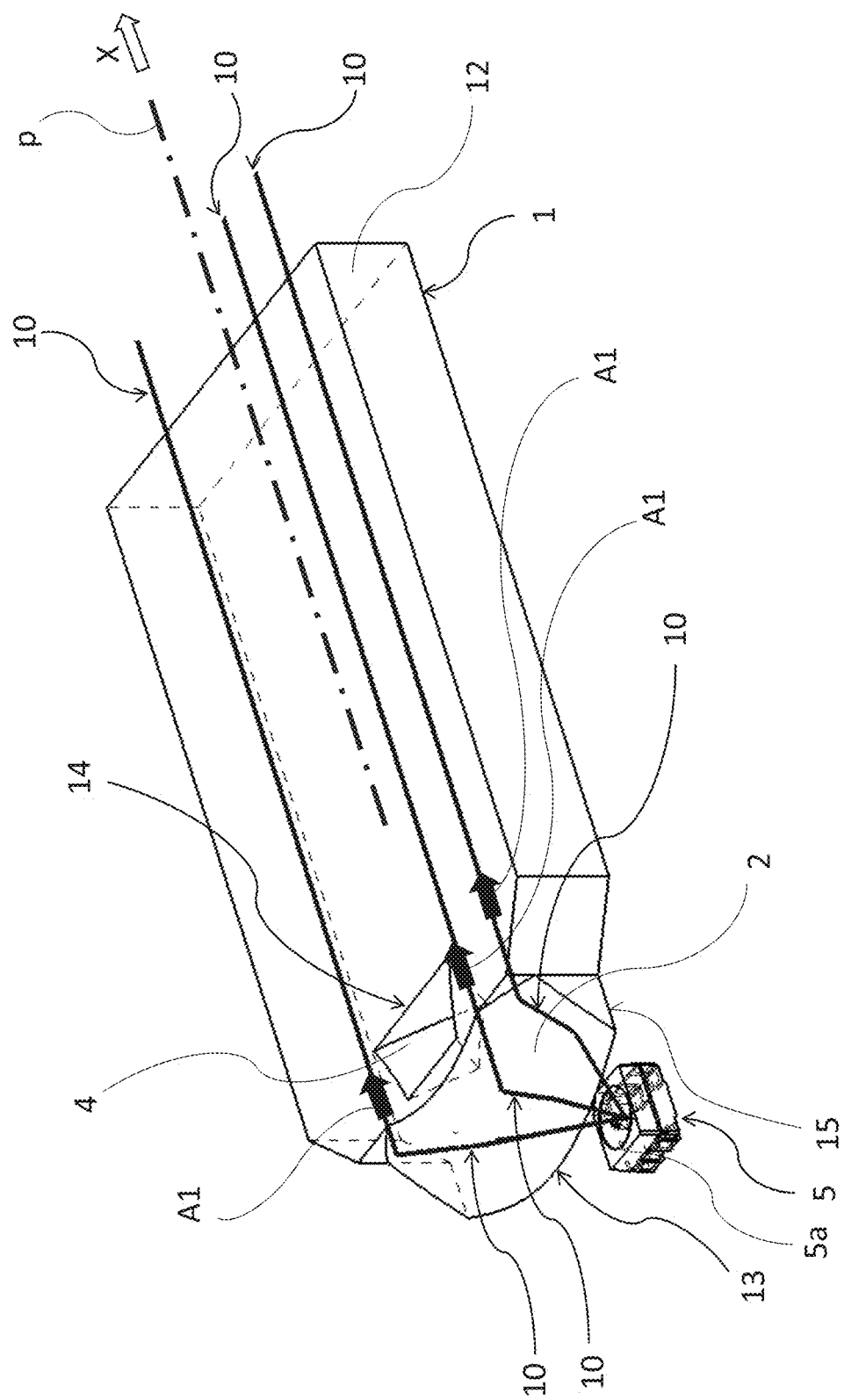
FIG. 6 shows the light-guiding optical unit of FIG. 1, indicating an example of paths of two light rays from the second part of light rays.
Figure 7:
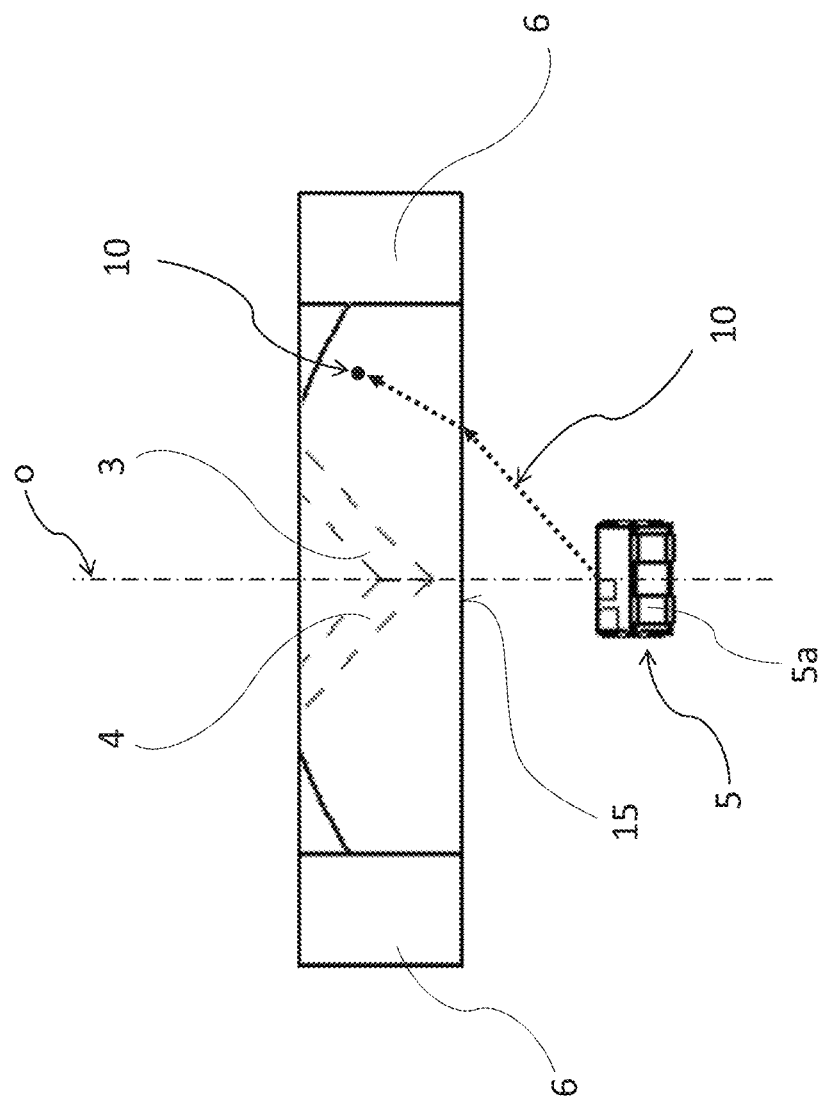
FIG. 7 shows a view of the rear side of the light-guiding optical unit of FIG. 1. indicating an example of the path of a light ray from the second part of light rays.
Figure 8:
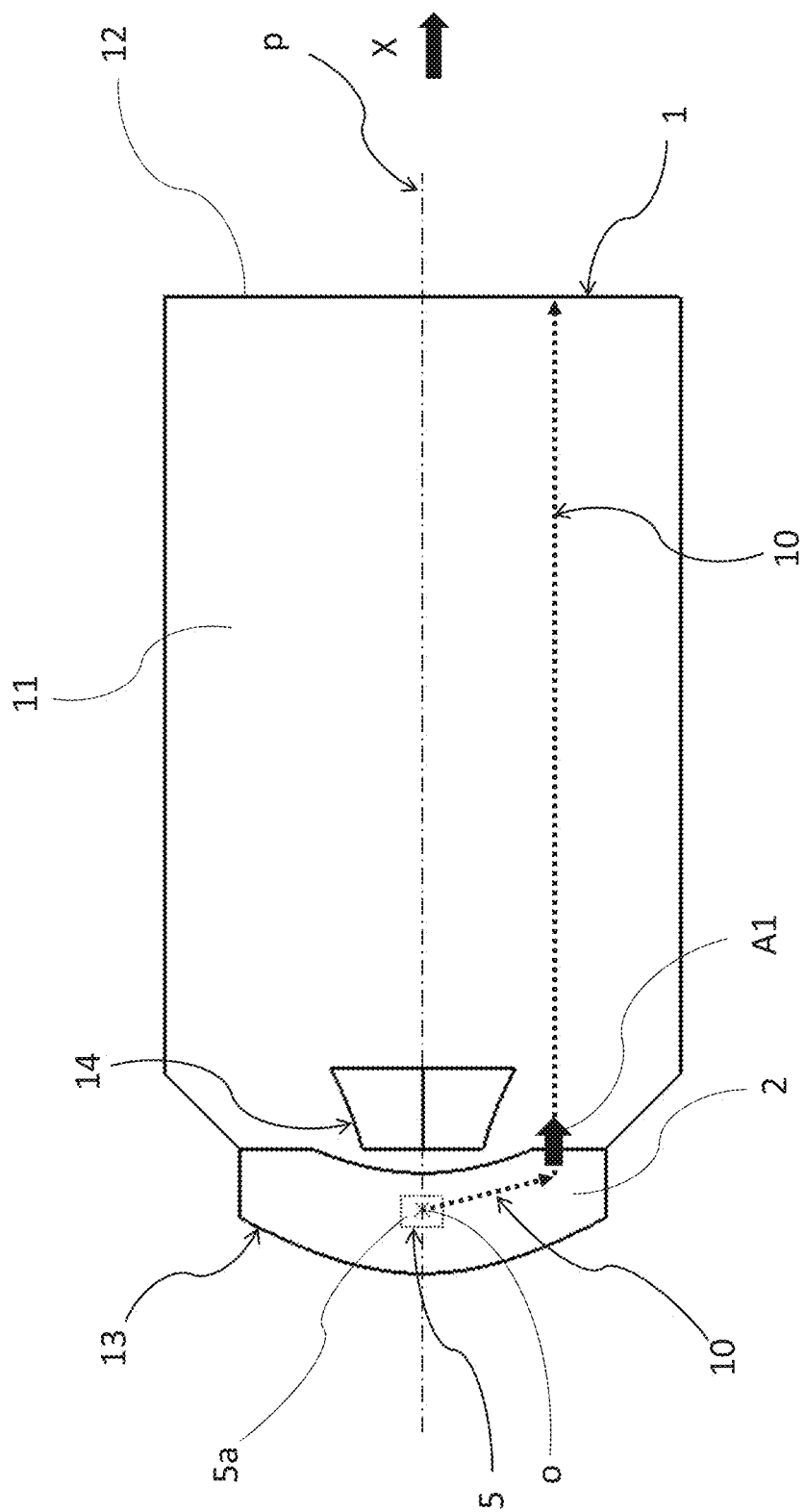
FIG. 8 shows a top view of the light-guiding optical unit of FIG. 7.

As shown, e.g., in FIGS. 5, 6 and 8, the first part of the light rays 10, after the above-mentioned binding via the planar binding surface 15, where depending on the incidence angle of the light rays 10 certain refraction/deflection of the light rays 10 occurs, falls on the first reflective surface 2 of the collimating element 13 from which it is reflected to the direction A1, which is preferably parallel to the longitudinal axis p of the light guide 1, while the paths of light rays 10 belonging to this first part do not pass through the recess 14.

Figure 9:
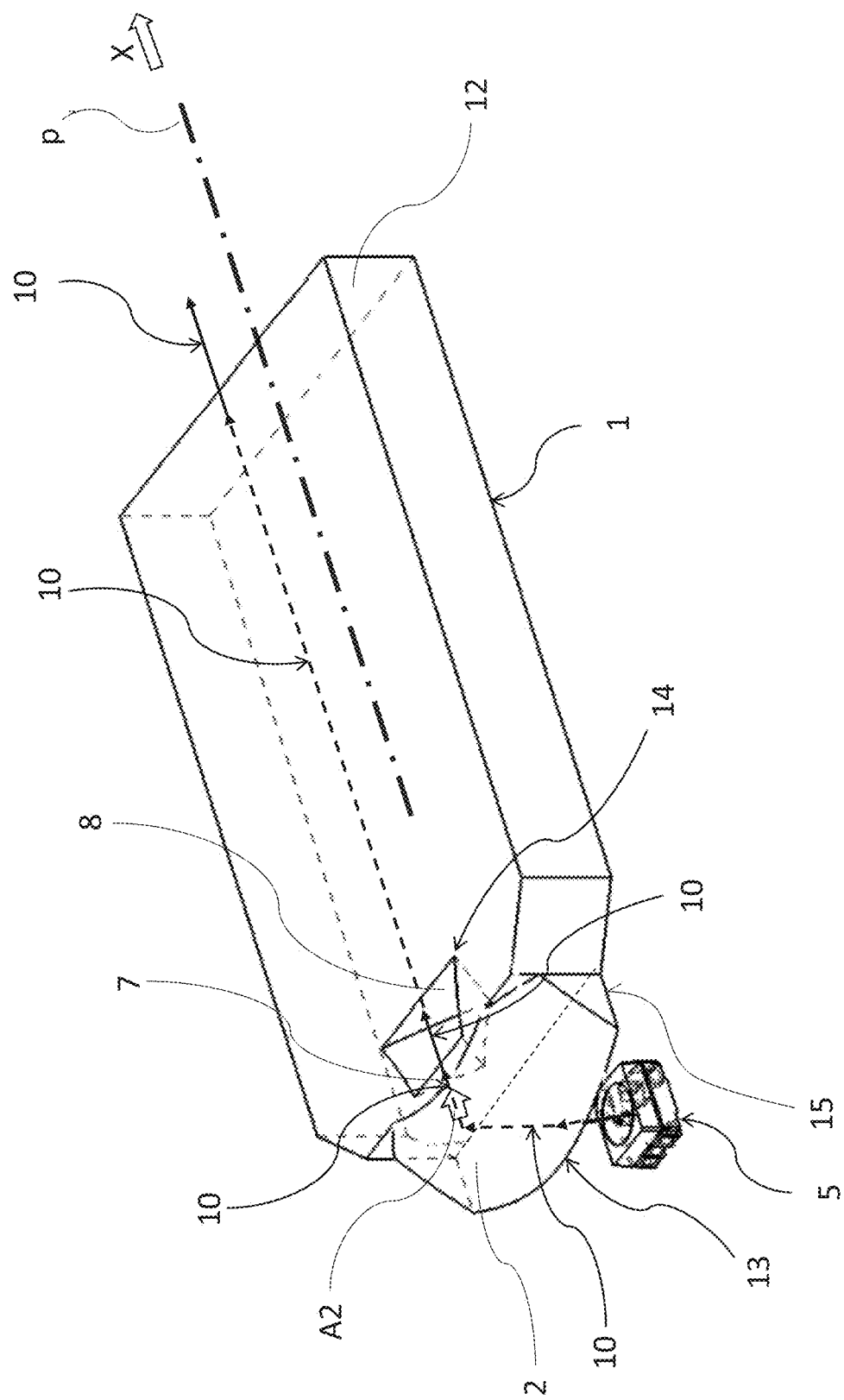
FIG. 9 shows the light-guiding optical unit of FIG. 1, indicating an example of the path of a light ray from the third part of light rays.
Figure 10:
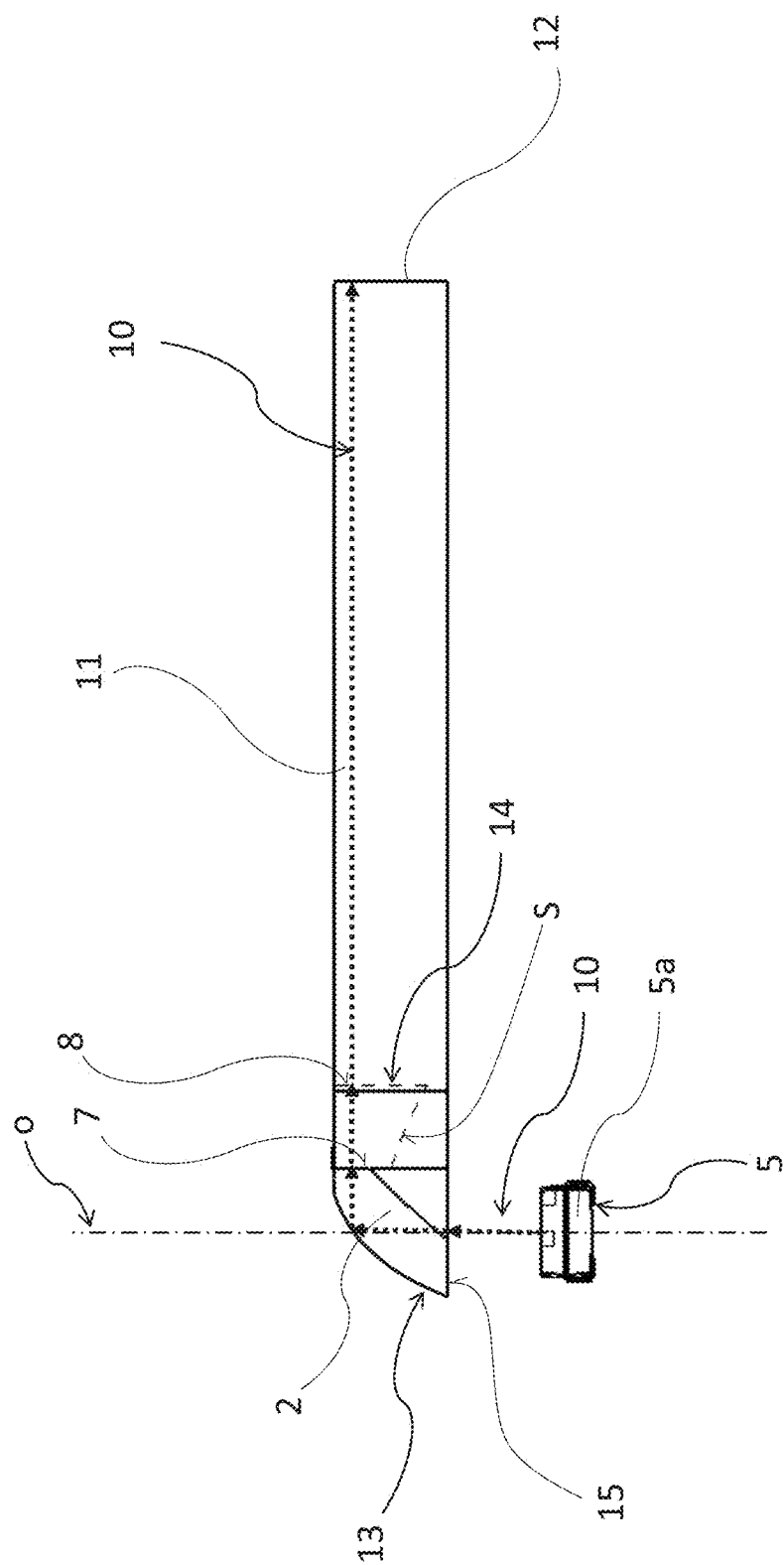
FIG. 10 shows a side view of the light-guiding optical unit of FIG. 9, indicating an example of the path of a light ray from the second part of light rays.
Figure 11:
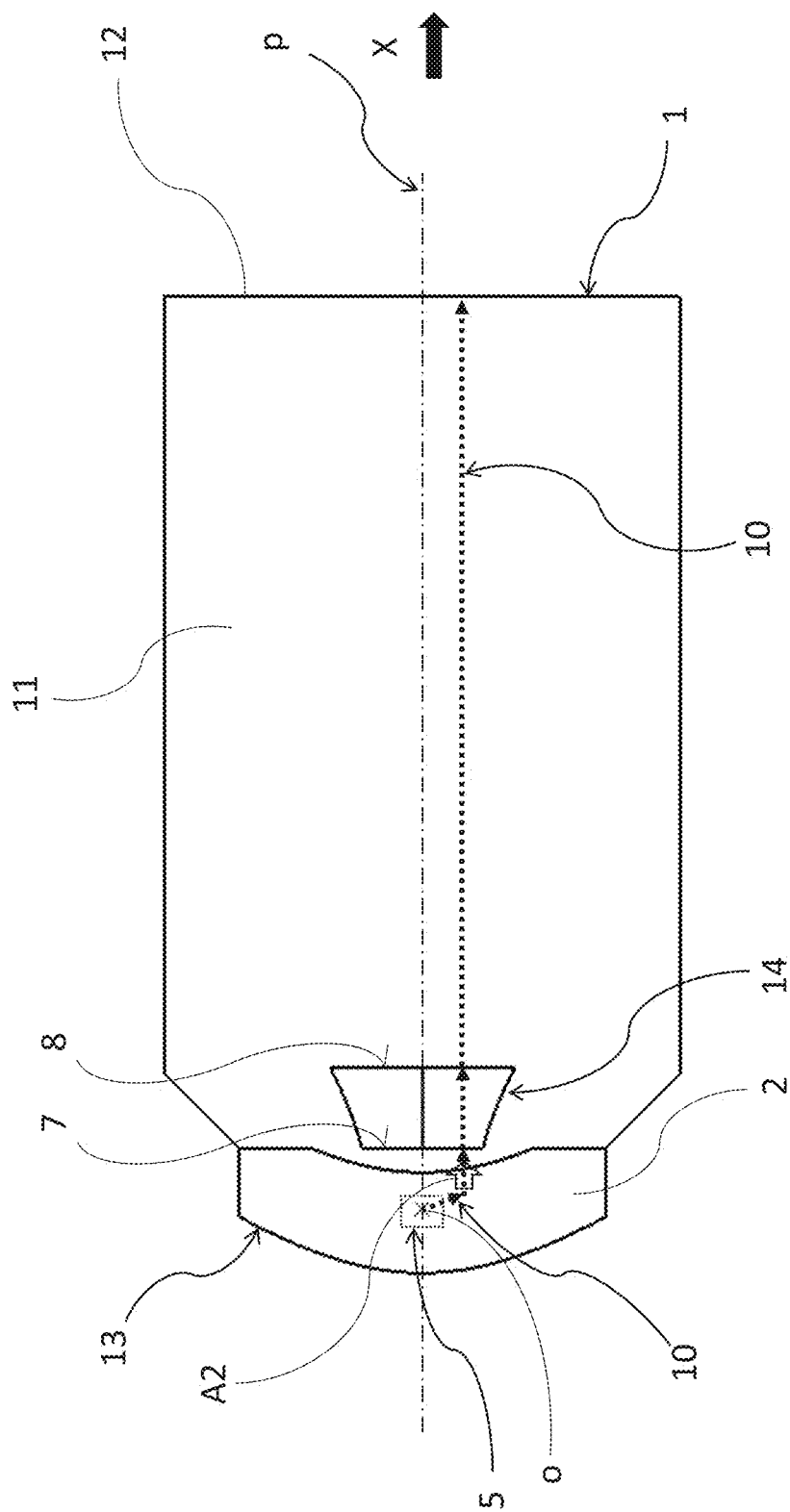
FIG. 11 shows a top view of the light-guiding optical unit of FIG. 1, indicating an example of the path of another light ray from the third part of light rays.
Figure 12:
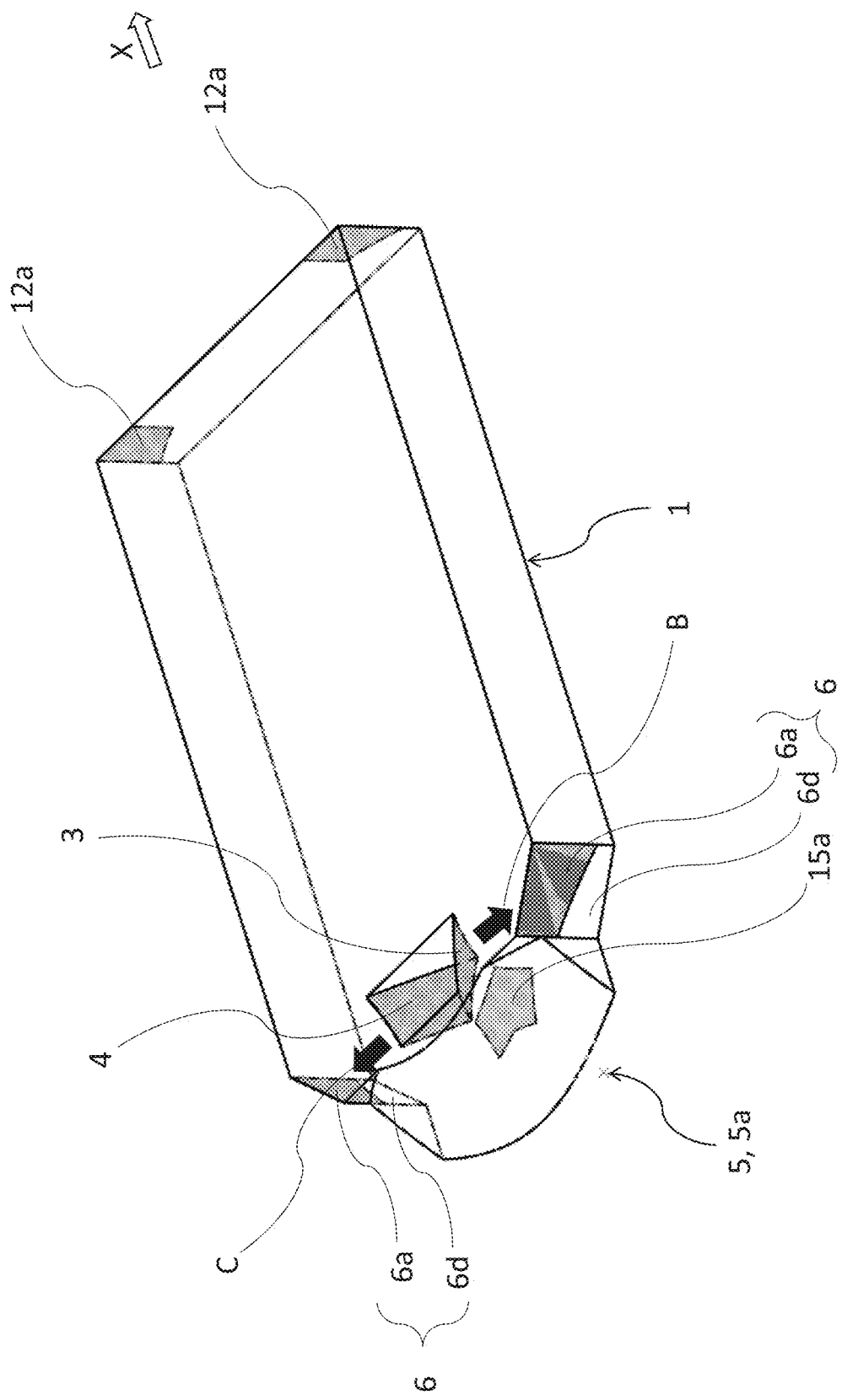
FIG. 12 shows the light-guiding optical unit of FIG. 1, indicating the binding region and the reflective and output regions of light rays from the first part of light rays.
Figure 13:
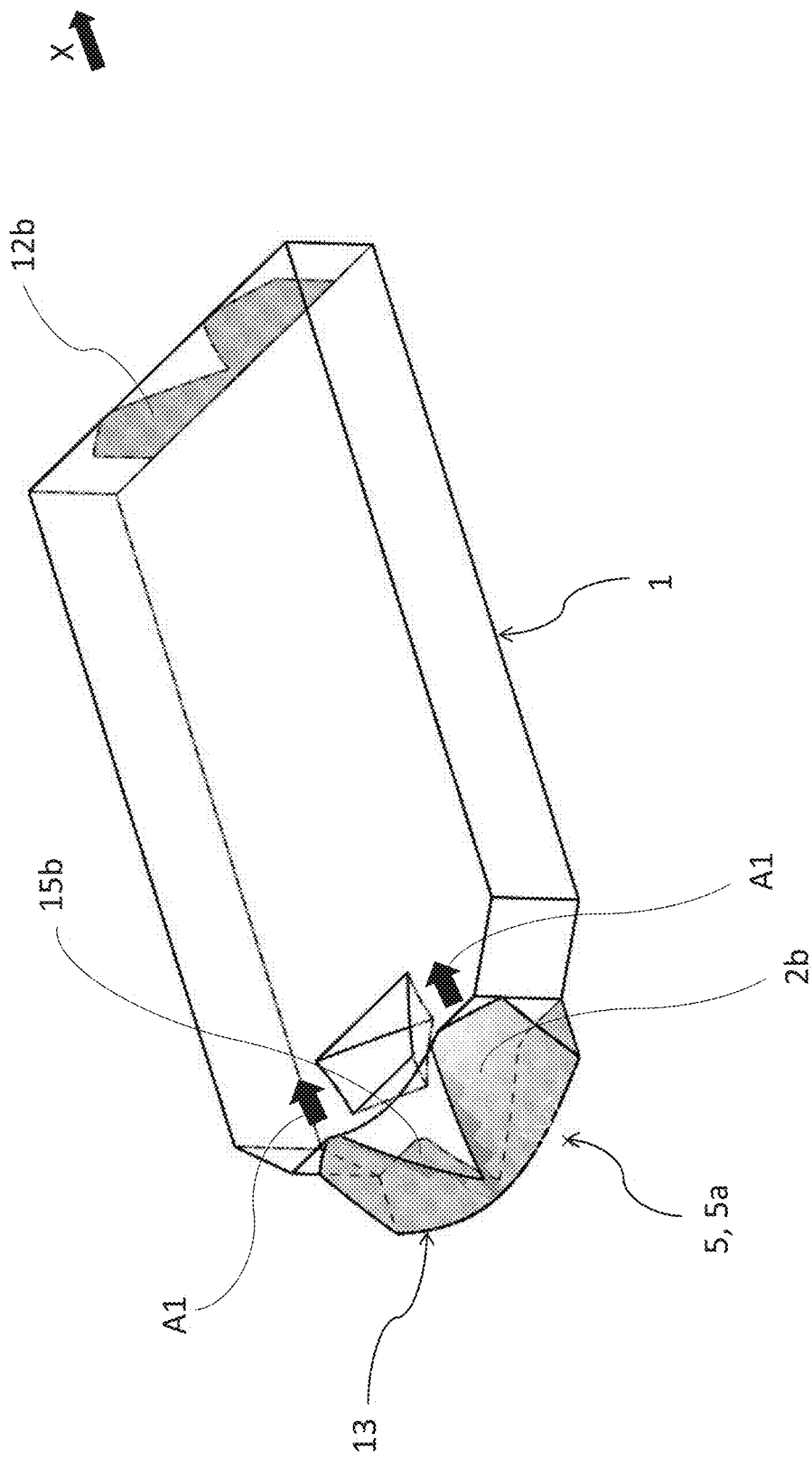
FIG. 13 shows the light-guiding optical unit of FIG. 1, indicating the binding, reflective and output regions of light rays from the second part of light rays.
Figure 14:
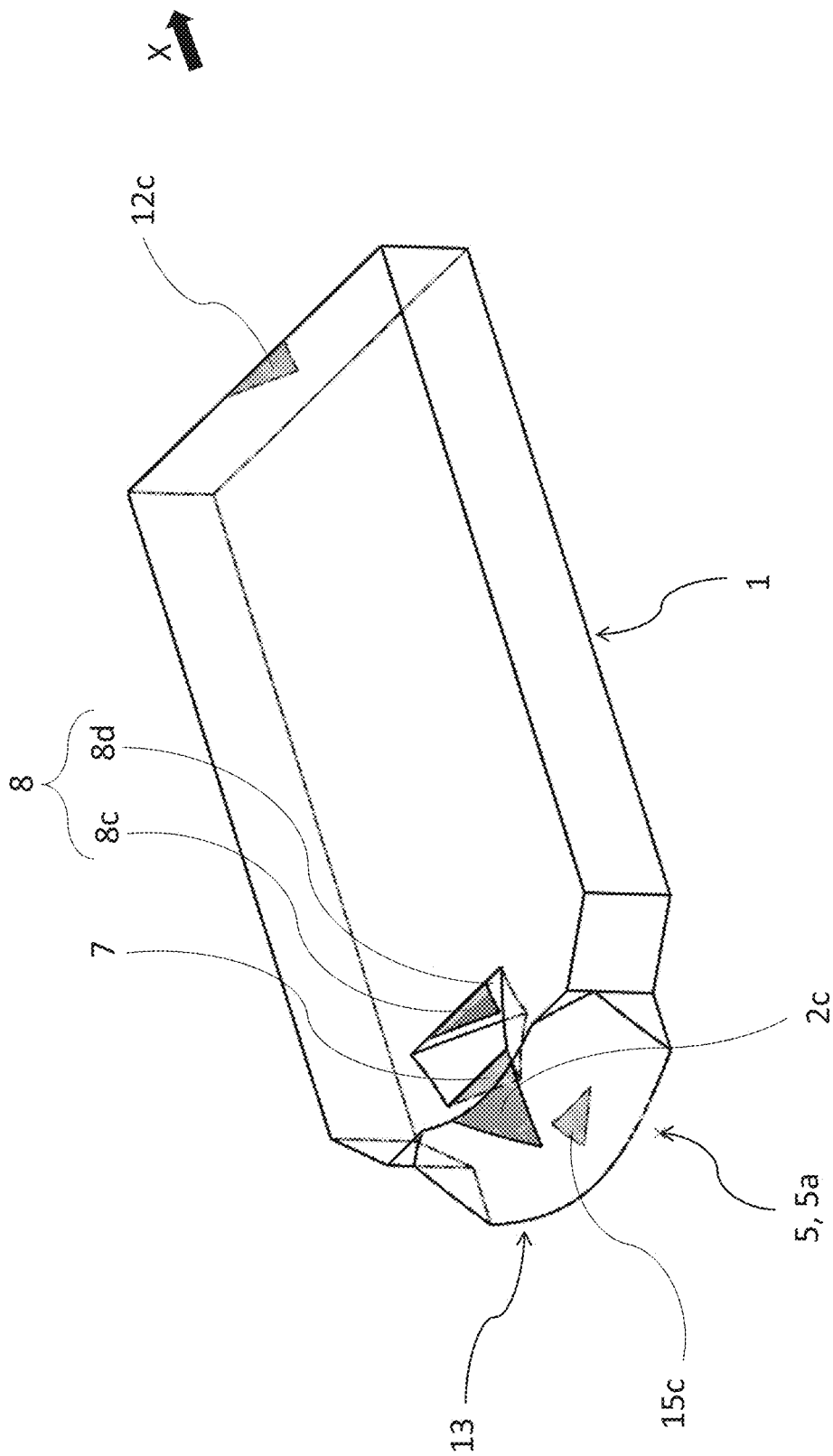
FIG. 14 shows the light-guiding optical unit of FIG. 1, indicating the binding, reflective and output region of light rays from the third part of light rays.
Figure 15:
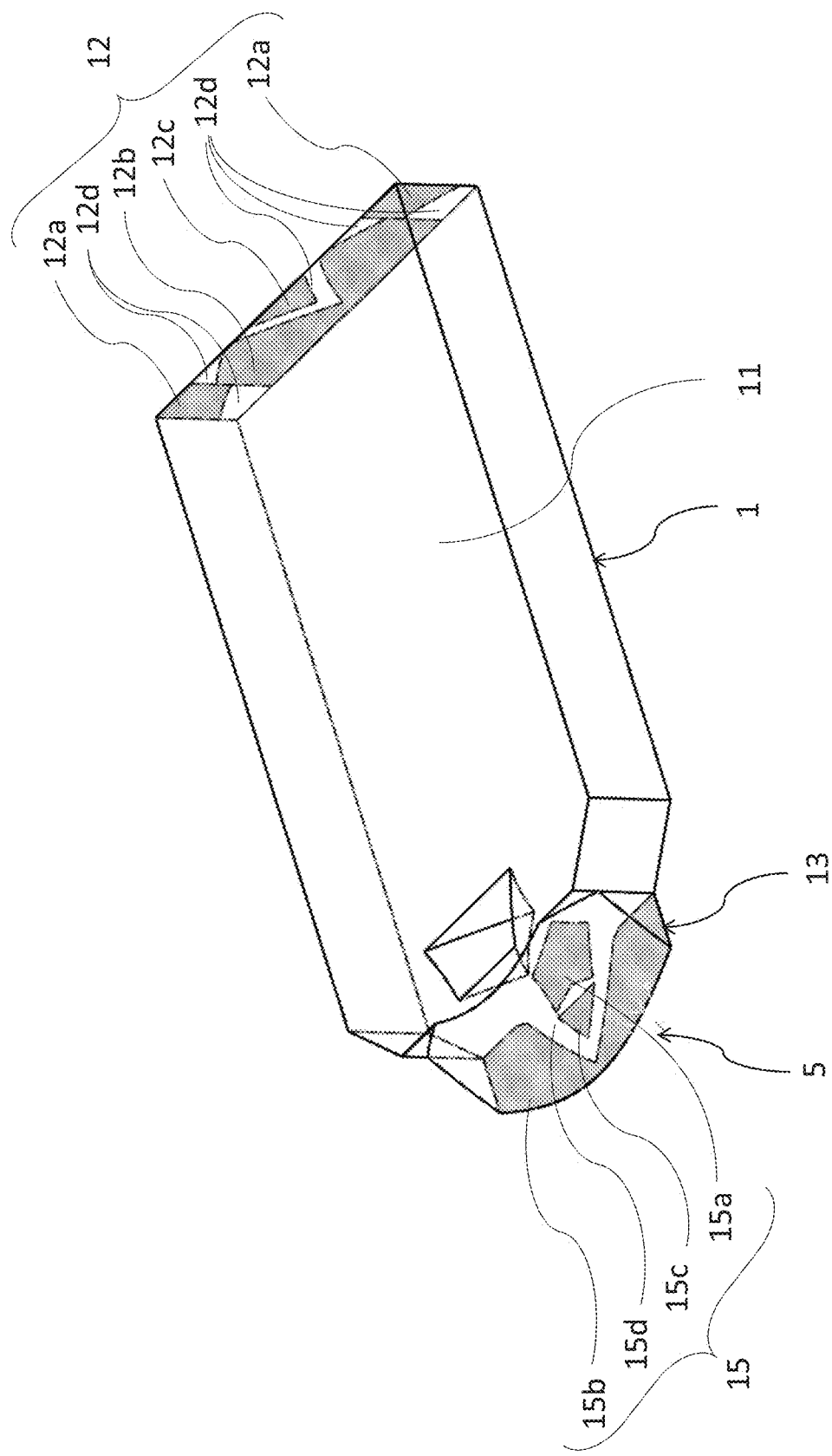
FIG. 15 shows the light-guiding optical unit of FIG. 1, indicating the binding and output regions of light rays from the first, second and third part of light rays.
Figure 16:
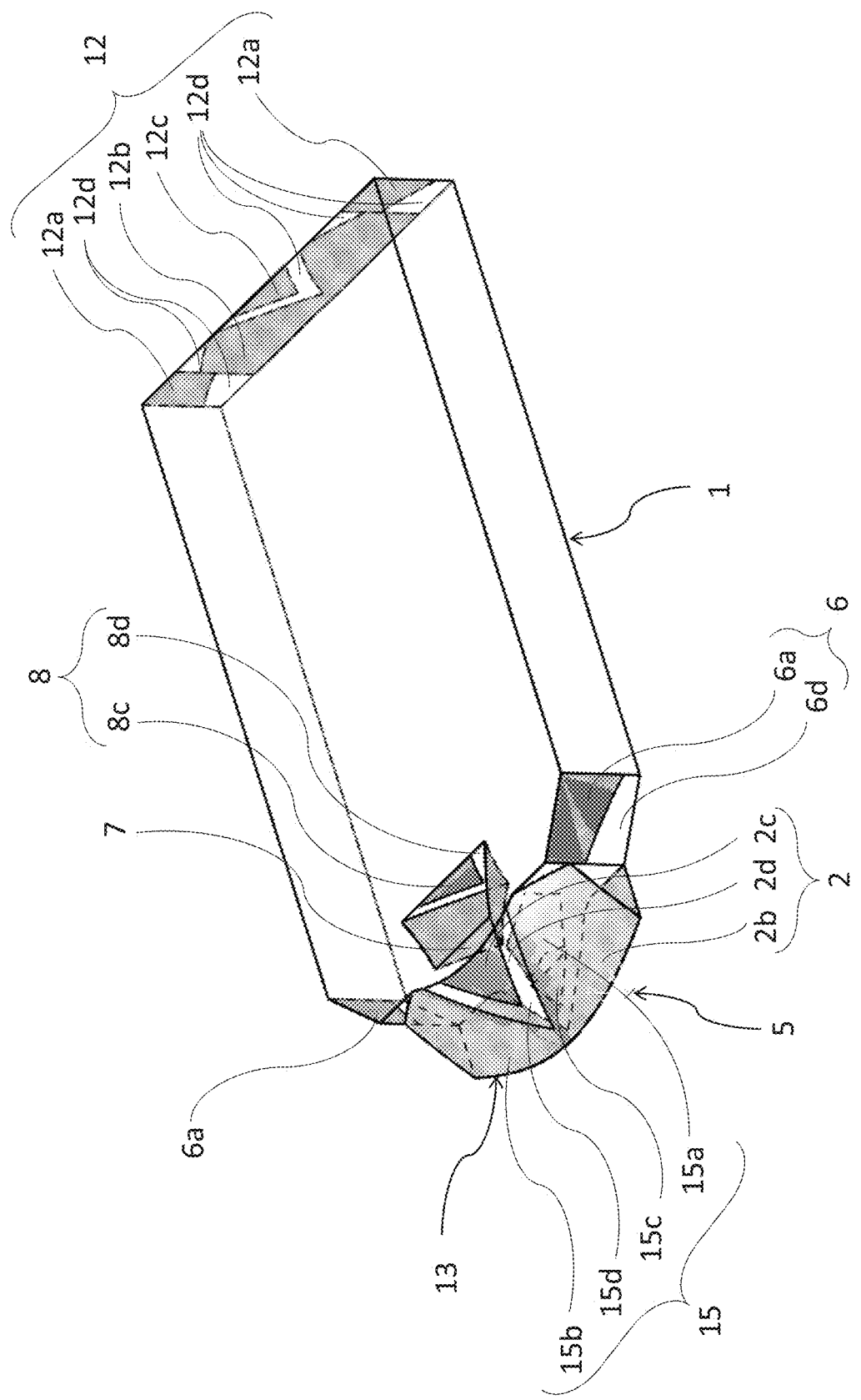
FIG. 16 shows the light-guiding optical unit of FIG. 1, indicating the binding, reflective and output regions of light rays from the first, second and third part of light rays.

As shown, e.g., in FIGS. 5, 9 and 11, the second part of the light rays 10 after the above-mentioned binding, falls onto the first reflective surface 2 of the collimating element 13 from which it is reflected to the direction A2, which is parallel to the direction A1 and preferably also to the longitudinal axis p of the light guide 1 while the paths of light rays 10 belonging to this second part pass through the recess 14. The recess 14 comprises the output surface 7 through which the light rays 10 temporarily exit from the light guide 1 body and at the same time enter the free space of the recess 14, and the inner binding surface 8 configured for re-entry of the light rays 10 from the recess 14 to the light guide 1. It is obvious from the above-mentioned description that the decisive factor for whether light rays 10 belong to the first or second part of the light rays is whether these rays pass (second part) or do not pass (first part) through the recess 14 as the directions A1 and A2 are identical.

As shown, e.g., in FIGS. 3, 4, 5 and 12, the third part of light rays 10, after the above-mentioned binding, does not fall onto the first reflective surface 2, but travels directly to the second reflective surface 3 from where it is reflected to the lateral direction B and the fourth part of light rays 10 after the above-mentioned binding, does not fall onto the first reflective surface 2, but travels directly to the third reflective surface 4 from where it is reflected to the lateral direction C which is preferably opposite to the direction B.

Thus, individual reflective surfaces 2, 3, 4 are configured to reflect light rays to three different directions A1 or A2, B, C. The reflective surfaces 3, 4 of the recess 14 are configured to reflect light rays 10 sent to them from the binding surface 15 of the light guide 1 and to direct them to the lateral reflective surface 6 which are part of the surface of the light guide 1 and are configured to reflect the light rays 10 to the output surface 12. The second reflective surface 3 and the third reflective surface 4 preferably have the shape of parts of paraboloids or approximate paraboloids, which is for simplification for the purposes of this application expressed in such a way that the second reflective surface 3 and the third reflective surface 4 have the shape of approximate paraboloids. This means that at each point of the paraboloid surface, total reflection of light rays 10 occurs while light rays 10 from different points of the paraboloid surface are sent approximately concurrently/in parallel since the light source 5a or sources 5a of the light unit 5 lie approximately at the focal points of these paraboloids and all the focal points of the paraboloids are situated at the same point. With regard to the requirement for a low total installation dimension of the optical system, the distance V between the light source 5a of the light unit 5 and the binding surface 15 preferably equals the maximum thickness H of the light guide 1 at the most. Further, the length D of the recess, which is defined by the mutual distance between the inner output surface 7 and the inner binding surface 8, preferably equals the thickness H of the light guide 1 at the most.

As it is apparent from FIGS. 12, 13, 14, 15, and 16, the binding surface 15 comprises the first binding region 15a to bind the third and fourth part of light rays 10 the second binding region 15b to bind the first part of light rays 10, and the third binding region 15c to bind the second part of light rays 10 the binding surface 15 also comprising less active light regions or inactive regions 15d. The light unit 5 is adapted to send light rays 10 to all the binding regions 15a, 15b, 15c, 15d of the binding surface 15 while the light rays 10 sent to the inactive regions 15d are bound to the internal structure of the light guide 1, but are not sent/directed towards the output surface 12.

The first reflective surface 2 comprises the first collimating region 2b configured to reflect/direct the first part of the light rays 10 (i.e. in the directions A1 and outside the recess 14), and the second collimating region 2c configured to reflect/direct the second part of the light rays 10 in the direction A2 and directly to the recess 14. The first reflective surface 2 also comprises less active or inactive light regions 2d and the light rays 10 reflected from them get completely lost. These light rays are reflected from the regions 2d in an undesired direction, so their part does fall onto the second reflective surface 3 and the third reflective surface 4, but they are subsequently reflected from these reflective surfaces 3 and 4 in such a way that they do not fall onto the lateral reflective surfaces 6.

Each of the two lateral reflective surfaces 6 comprises an inactive region 6d and active region 6a to direct the third/fourth part of the light rays 10. Also, the inner binding surface 8 of the recess 14 comprises a less active or inactive region 8d and an active region 8c to which the second part of the light rays 10 that have passed through the inner output surface 7 of the recess 14 is sent in the direction A2. The output surface 12 comprises two first output regions 12a for the output of the third and fourth part of the light rays 10, one second output region 12b for the output of the first part of the light rays 10 and one third output region 12c for the output of the second part of the light rays 10 the output surface 12 also comprising less active or inactive light regions 12d.

Figure 17:
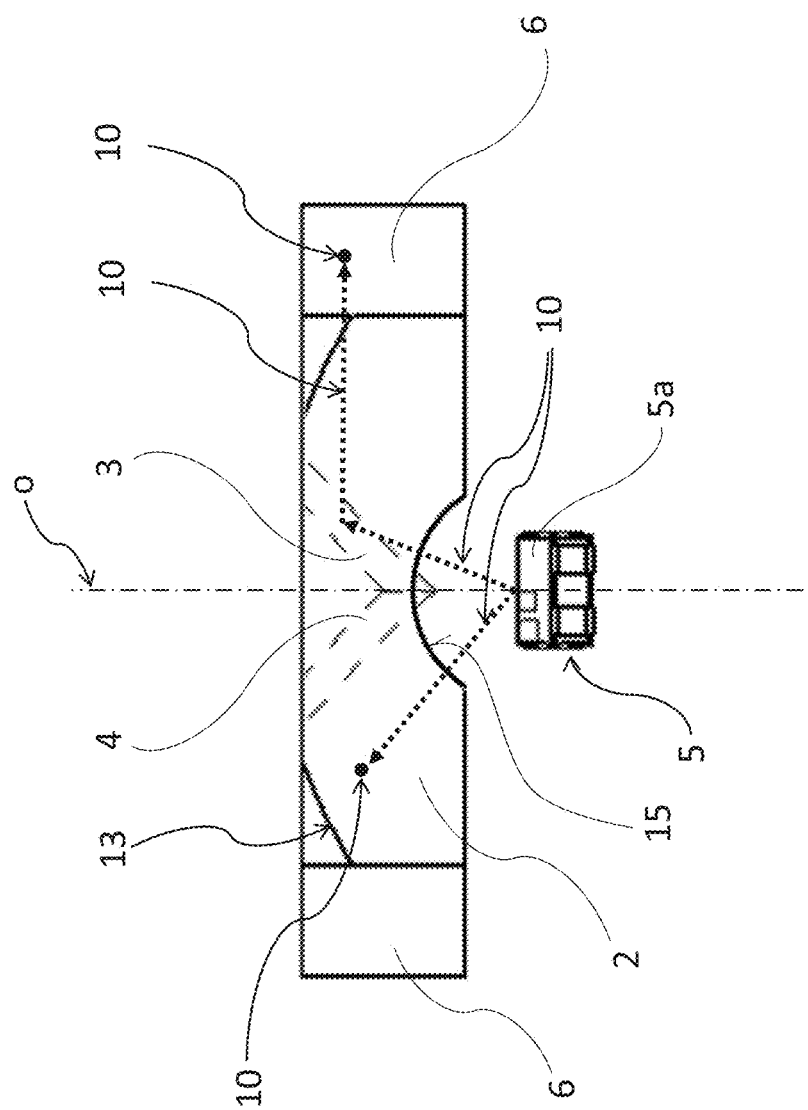
FIG. 17 shows another embodiment example of a light-guiding optical unit according to the invention, in a view of the rear side of the light-guiding optical unit.

FIG. 17 shows the second embodiment example of a light-guiding optical unit according to the present invention that comprises a spatially shaped binding surface 15. If the binding surface 15 has the shape of a concave ball surface, no refraction of light rays 10 occurs. The first reflective surface 2 and/or the second reflective surface 3 and/or the third reflective surface 4 have the shape of parts of paraboloids, the light source 5a of the light unit 5 being situated at the focal points of these paraboloids.

Figure 18:
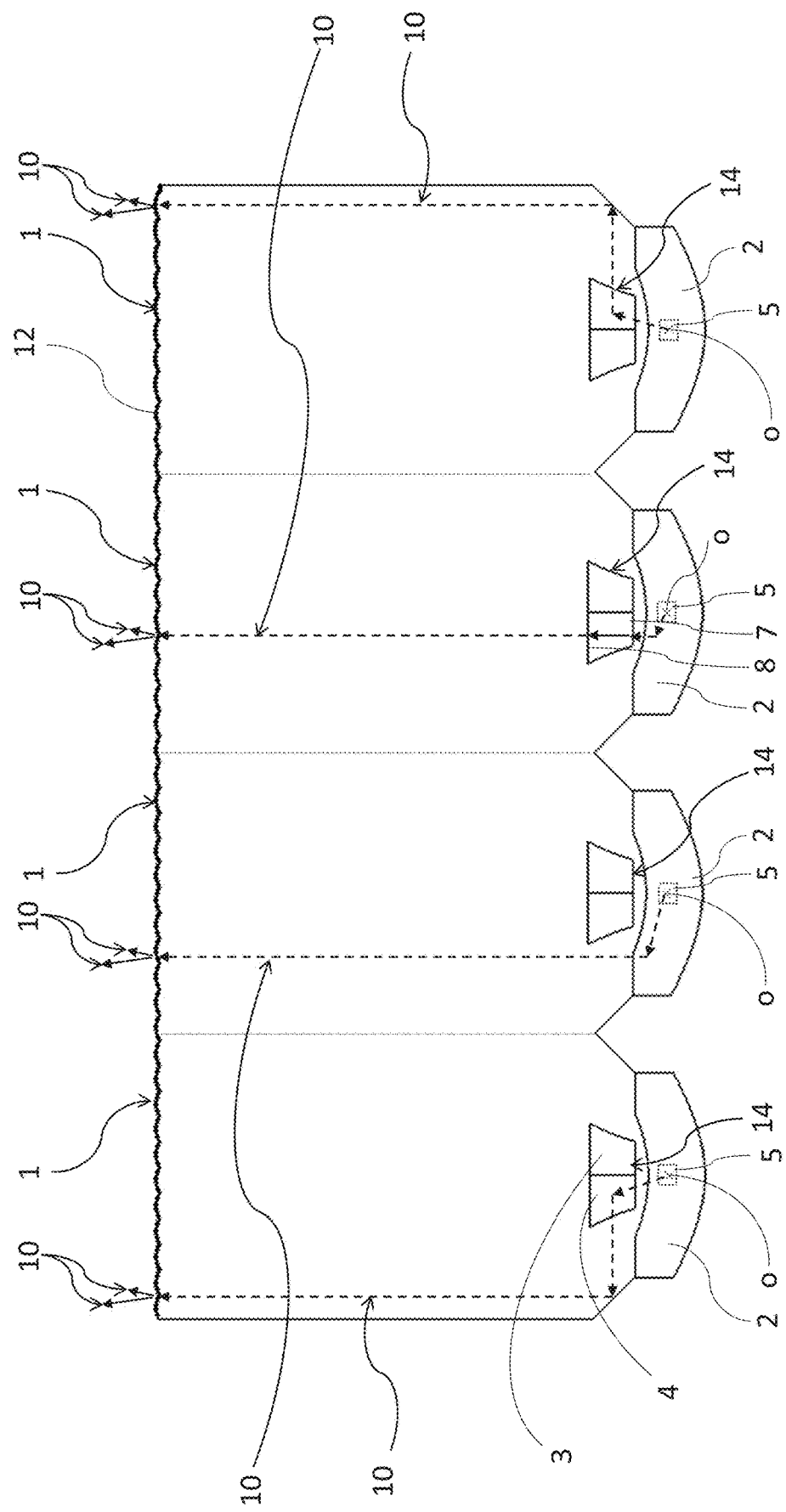
FIG. 18 shows, in a top view, an embodiment example of a light-guiding optical system according to the invention, comprising light-guiding optical units according to the invention.
Figure 23:
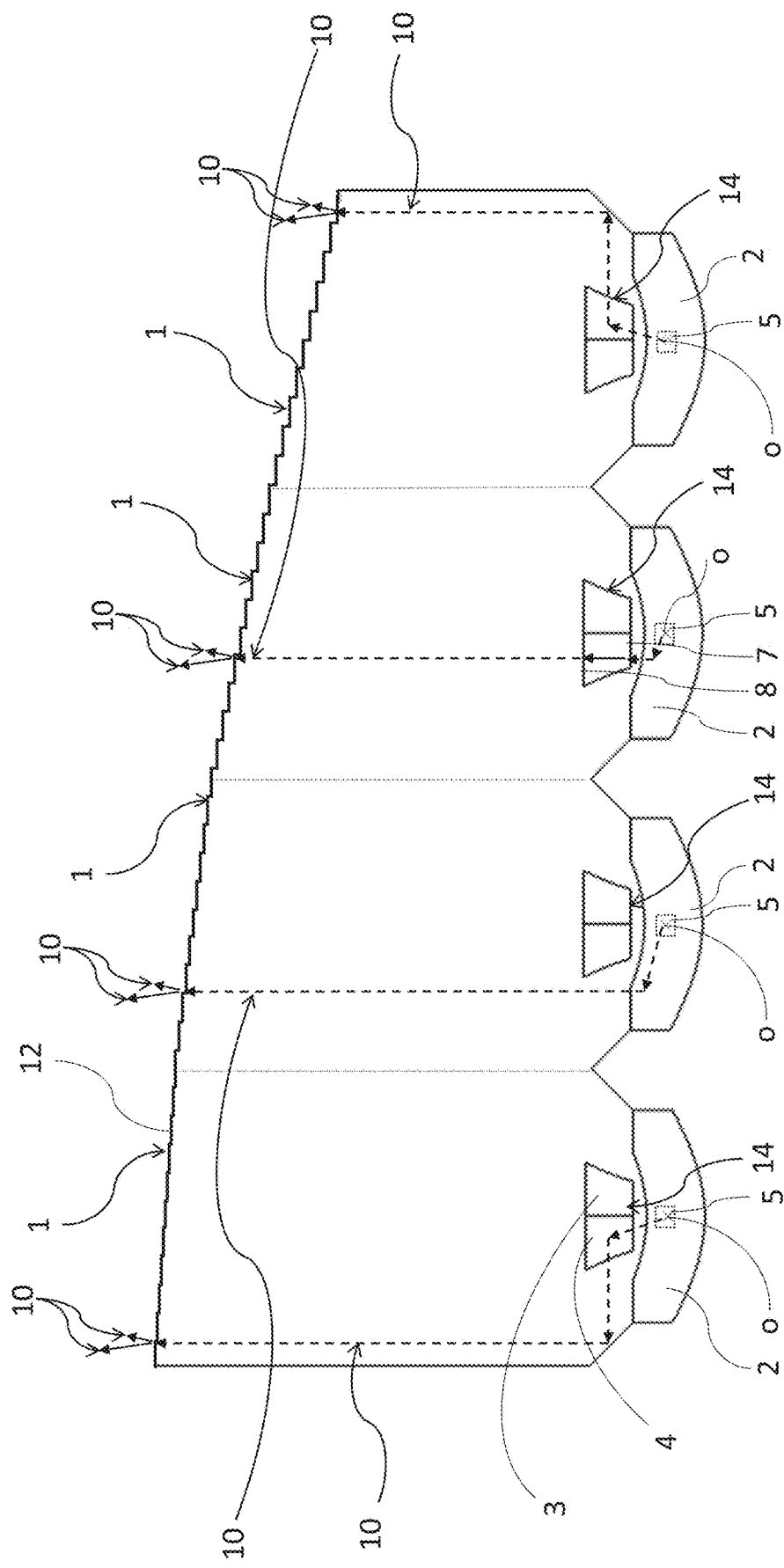
FIG. 23 shows, in a top view, another embodiment example of a light-guiding optical system according to the invention, comprising light-guiding optical units according to the invention.

The invention also relates to a light-guiding optical system whose embodiment examples are shown in FIG. 18 and FIG. 23. The light-guiding optical system comprises adjacent light-guiding units whose embodiment examples are described above. The light guides 1 of the light-guiding units are preferably made as one integral molding to create a continuous combined output surface comprising the output surfaces 12 of individual adjacent light guides 1 for the output of light rays 10 from the light-guiding optical system. Each light guide 1 has its associated light unit 5 comprising at least one light source 5a.

The output surface 12 of the light guide 1 is preferably equipped with optical elements for diffusion of the light rays 10 exiting from the light guide 1 plate 11, from the optical axis x of the light-guiding optical unit to eliminate the inactive regions 12d on the output surface 12 of the light guide 1. An example of diffusing optical elements is shown in FIG. 18.

Figure 19:
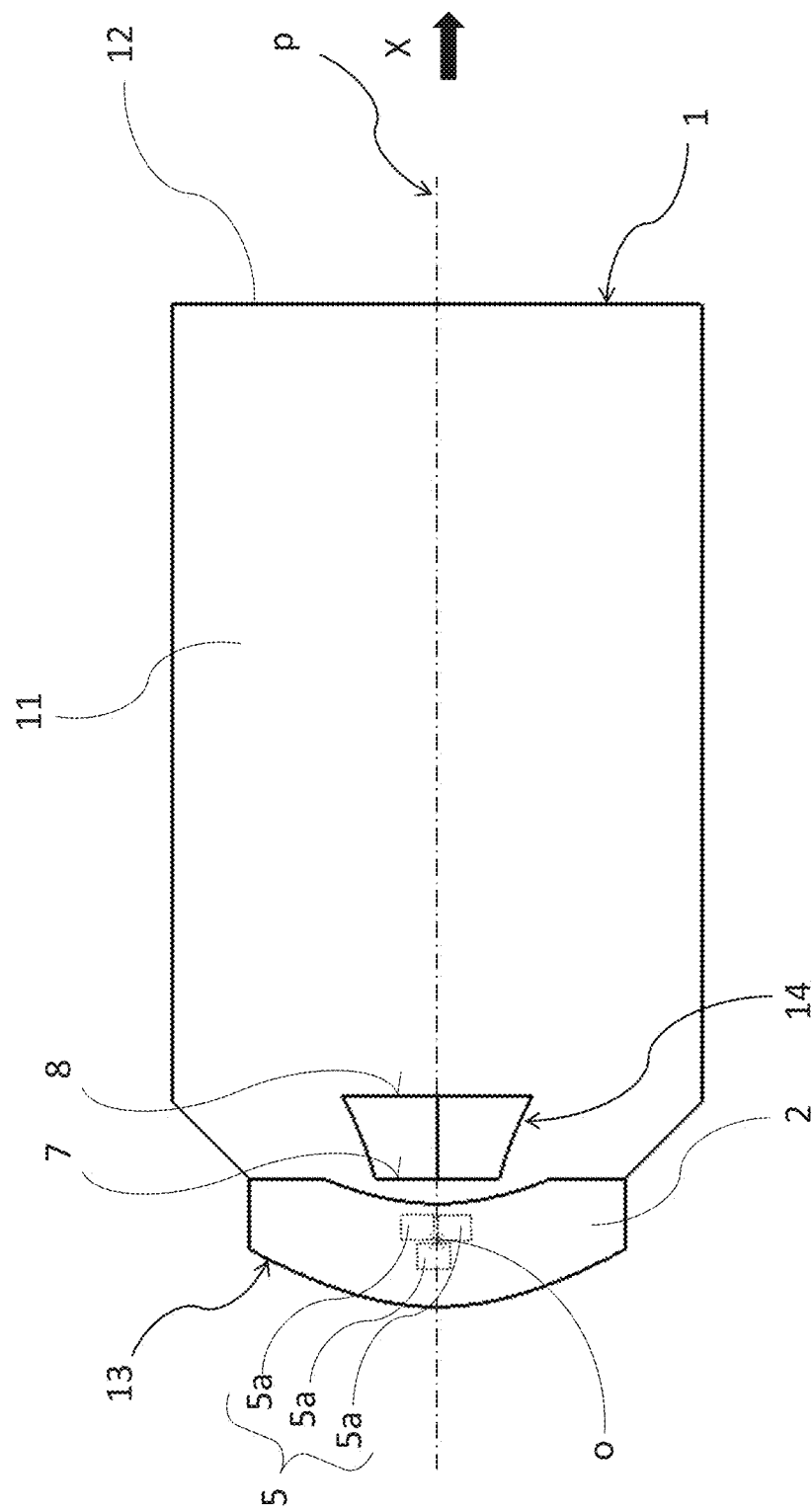
FIG. 19 shows, in a top view, another embodiment of a light guiding optical unit comprising a light unit with multiple light sources situated next to each other.

FIG. 19 shows an example of a light-guiding optical unit whose light unit 5 comprises multiple adjacent light sources 5a.

Figure 20:
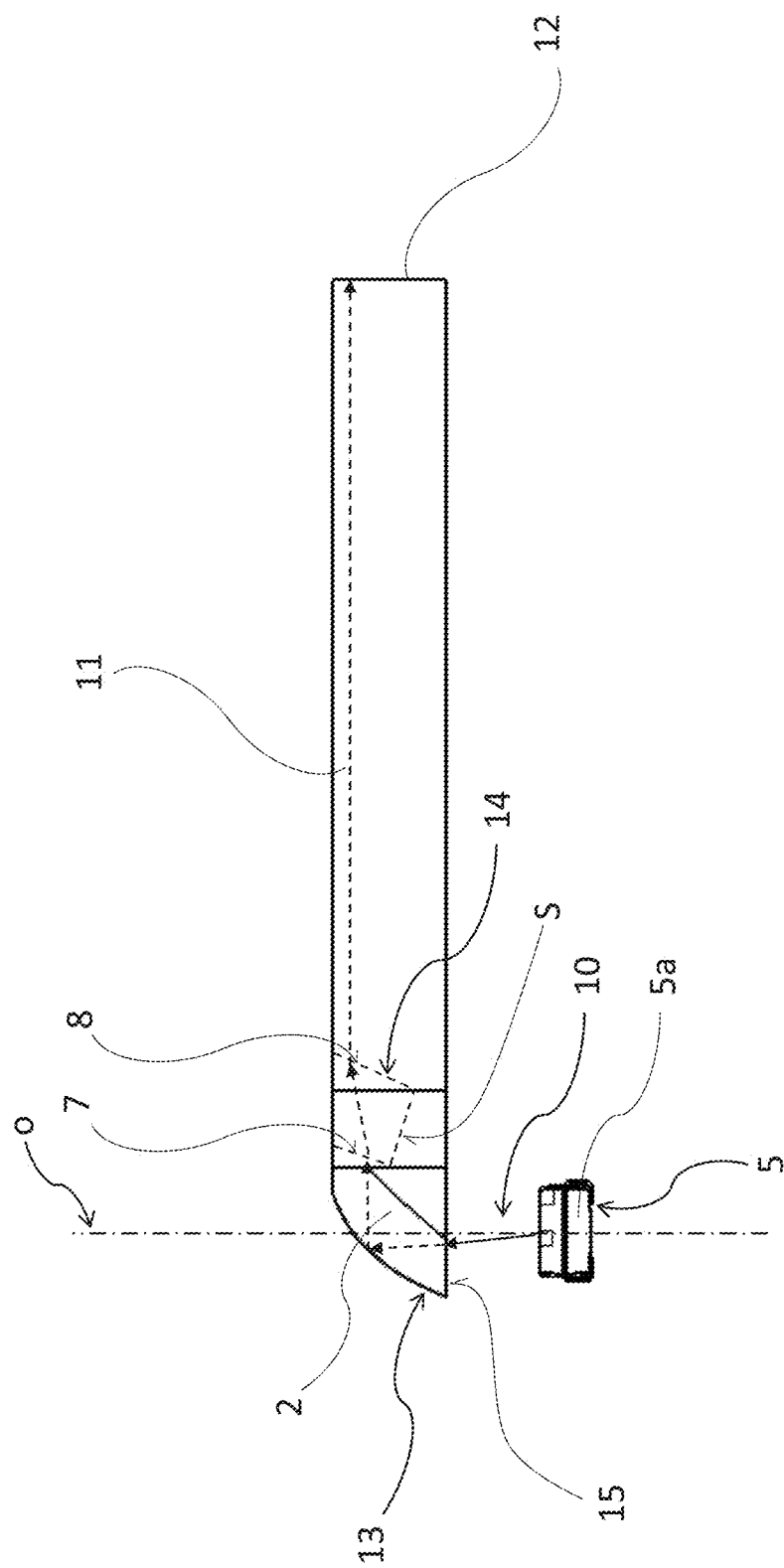
FIG. 20 shows a side view of another embodiment example of a light-guiding optical unit with a differently designed recess.

FIG. 20 shows an embodiment example of a light-guiding optical unit according to the present invention, wherein the output surface 7 and the inner binding surface 8 of the recess 14 are directionally oriented/deflected, the output surface 7 having a different inclination from the inner binding surface 8.

Figure 21:
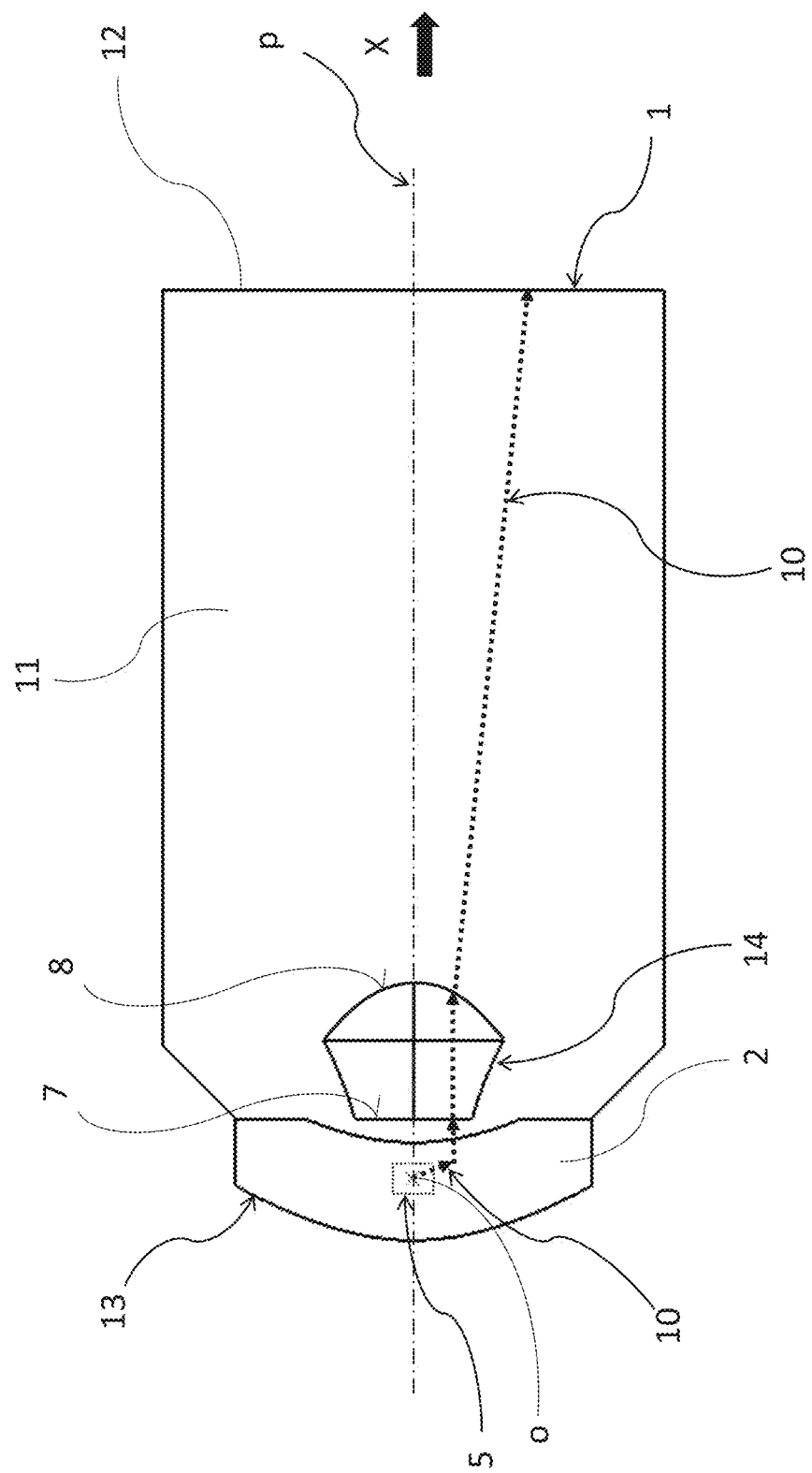
FIG. 21 shows a top view of yet another embodiment example of a light-guiding optical unit with a differently designed recess.
Figure 22:
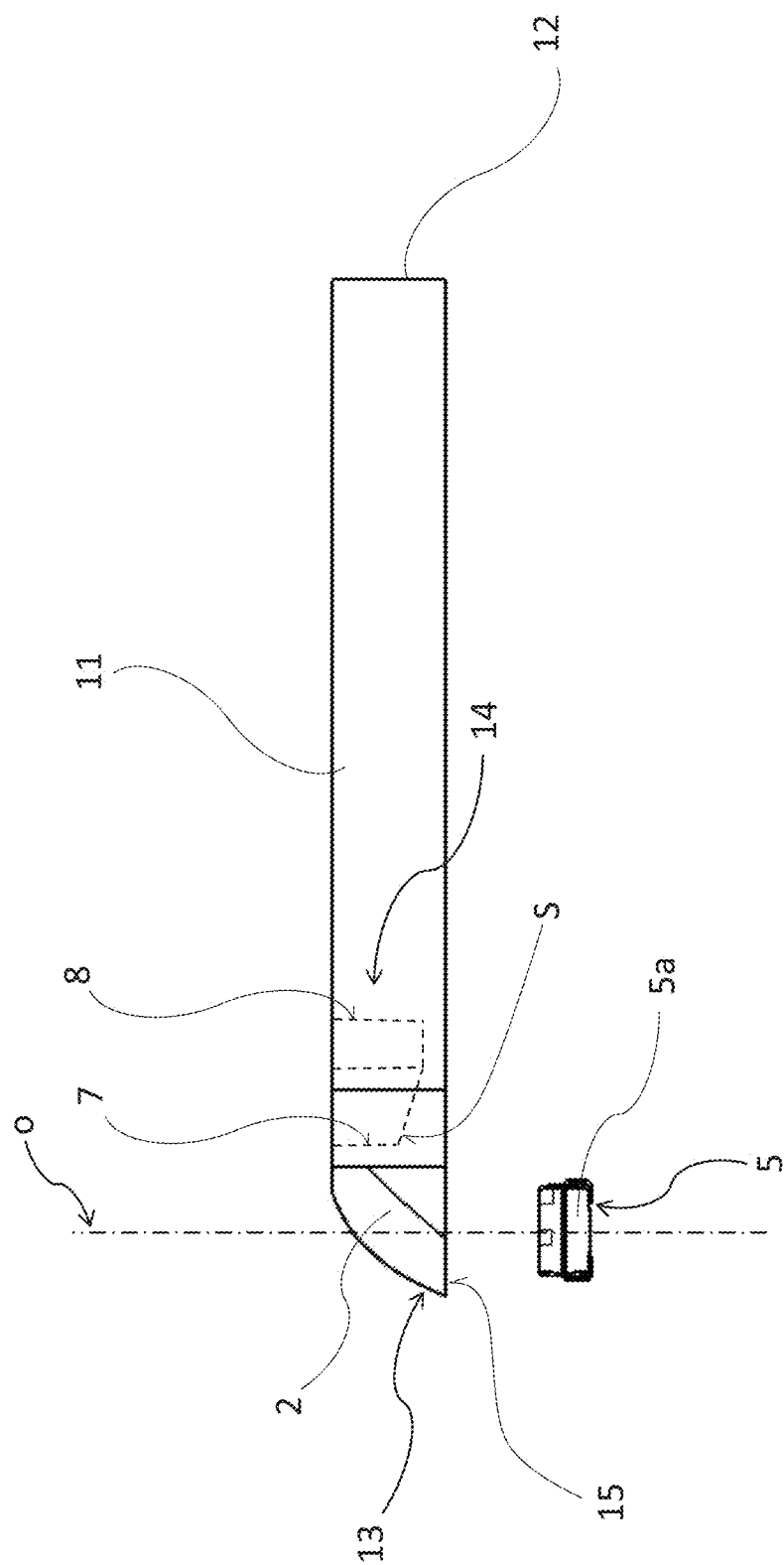
FIG. 22 shows a side view of the light-guiding optical unit of FIG. 21.

FIGS. 21 and 22 show an embodiment example of a light-guiding optical unit according to the present invention, wherein the inner binding surface 8 of the recess 14 is implemented as a part of a cylindrical surface for directional deflection of light rays 10.

In embodiment examples, which are not shown here, the binding surface 15 can have the shape of a part of a cylinder or a convex ball surface, while regardless of the shape of the binding surface 15 the binding surface 15 can be spatially oriented.

FIG. 24 shows an example of a light-guiding optical unit whose binding surface 15 of the light guide 1 is planar, but inclined/rotated with respect to the optical axis o of the light unit 5 while the bottom surface 17 of the light guide 1 is equipped with a directing reflective surface 18 to direct light rays 10 towards the output surface 12 of the light guide 1.

Another implementation of the light-guiding optical unit according to the present invention, which is not shown here, is an embodiment wherein the lateral reflective surface 6 comprises multiple stepwise arranged reflective surfaces configured for total reflection and direction of light rays to the output surface 12 or to the directing reflective surface 18.

The light sources 5a used in the light-guiding optical unit or the light-guiding optical system according to the invention can be advantageously mounted on a PCB.

An advantage of the light-guiding optical unit and light-guiding optical system according to the invention is that they make it possible to achieve a minimal distance between the light guide 1 and the PCB, which also means lower installation space requirements within the vehicle body.

The advantages of the design according to the invention also comprise a small number of LED sources necessary to light up a long thin strip, while maintaining a homogeneous appearance and good efficiency. The design enables efficient redistribution of light of a circular cross-section into an oblong cross-section whose one side is considerably longer than the other side.

LIST OF REFERENCE MARKS

1—light guide
2—first reflective surface
2b—first collimating region
2c—second collimating region
2d—inactive region
3—second reflective surface
4—third reflective surface
5—light unit
5a—light source
6—lateral reflective surface
6a—active region
6d—inactive region
7—inner output surface
8—inner binding surface
8c—active region
8d—inactive region
9—connecting line
10—light ray
11—light-guiding plate
12—output surface
12a—first output region
12b—second output region
12c—third output region
12d—inactive region
13—collimating element
14—recess
15—binding surface
15a—first binding region
15b—second binding region
15c—third binding region
15d—inactive region
16—top surface
17—bottom surface
18—directing reflective surface
o—optical axis of the light unit 5
p—longitudinal axis of the light guide 1
S—connecting line
S1—contact point
X—optical axis of the light-guiding optical unit
A1, A2, B, C—direction
D—length
V—distance
H—thickness

The invention claimed is:

1. A light-guiding optical unit comprising a light guide made of an optically transparent material having a shape of a plate with a top surface, a bottom surface, a pair of lateral reflective surfaces, and an output surface for an exit of light rays out of the light guide, a light unit to emit light rays, and a collimating element to collimate at least a part of light rays emitted by the light unit and to direct them so that they advance thought the light guide, the top surface or the bottom surface of the light guide being fitted with a recess whose surface comprises a second reflective surface and a third reflective surface being configured to reflect light rays falling onto them to the lateral reflective surfaces configured to reflect light rays in the direction towards the output surface, wherein the collimating element comprises a first reflective surface configured to reflect light rays that fall onto the first reflective surface in the direction (A1, A2) towards the output surface, the recess being situated between the first reflective surface and the output surface so that a part of the light rays reflected from the first reflective surface passes, before falling onto the output surface, through the recess, wherein the surface of the recess comprises an inner output surface configured for the entry of light rays into the recess, and thus at the same time also a temporary exit of these rays from the light guide, and an inner binding surface configured to ensure re-entry of light rays from the recess to the light guide, and wherein each of the inner output surface and the inner binding surface connects the second reflective surface and the third reflective surface with the second reflective surface and the third reflective surface forming the bottom surface of the recess.

2. The light-guiding unit according to claim 1, wherein the first reflective surface comprises a first collimating region and a second collimating region, wherein the first collimating region is configured to reflect light rays falling onto it in the direction (A1) in such a way that the path of these light rays from the first reflective surface to the output surface does not pass through the recess, and the second collimating region is configured to reflect light rays falling onto it in the direction (A2) in such a way that the path of these light rays from the first reflective surface to the output surface passes through the recess, the directions (A1) and (A2) being parallel to each other.

3. The light-guiding optical unit according to claim 1, wherein an optical axis (o) of the light unit lies outside the said recess.

4. The light-guiding optical unit according to claim 1, wherein the surface of the recess comprises the second reflective surface and the third reflective surface that open from a common contact line comprising the deepest place of the recess, and are configured to reflect light rays falling onto them, sent directly from a binding surface of the light guide, to respective lateral directions (B) and (C), and then to the respective lateral reflective surfaces.

5. The light-guiding optical unit according to claim 1, wherein the second reflective surface, third reflective surface, the inner output surface and the inner binding surface delimit the said recess together.

6. The light-guiding optical unit according to claim 1, wherein the optical axis (o) of the light unit passes through the first reflective surface.

7. The light-guiding optical unit according to claim 1, wherein the first reflective surface, second reflective surface and third reflective surface have the shape of parts of approximate paraboloids, a light source or sources of the light unit being situated approximately at the focal points of these paraboloids found at the same point.

8. The light-guiding optical unit according to claim 1, wherein the optical axis (o) of the light unit is approximately perpendicular to the direction of the light rays reflected from the first reflective surface.

9. The light-guiding optical unit according to claim 1, wherein the collimating element and the light guide form an integral plastic molding.

10. The light-guiding optical unit according to claim 1, wherein it is symmetrical with respect to the plane of symmetry perpendicular to the top surface and bottom surface of the light guide and passing through a longitudinal axis (p) of the light guide.

11. The light-guiding optical unit according to claim 10, wherein a connecting line lies on the plane of symmetry.

12. A light-guiding optical system comprising two or more optical units according to claim 1, whose light guides are situated next to each other and form one integral molding together to create a continuous composite output surface comprising the output surfaces of individual light guides positioned next to each other, for the output of light rays from the light-guiding optical system.

13. A light-guiding optical unit comprising a light guide made of an optically transparent material and having a shape of a plate, said light guide comprising:
- a top surface having a planar shape;
- a bottom surface having a planar shape;
- a pair of lateral reflective surfaces;
- an output surface for an exit of light rays out of the light guide;
- a light unit to emit light rays;
- a collimating element to collimate at least a part of light rays emitted by the light unit and to direct them so that the light rays advance thought the light guide, wherein the collimating element comprises a first reflective surface configured to reflect light rays that fall onto the first reflective surface in the direction (A1, A2) towards the output surface; and
- a recess positioned in the top surface or the bottom surface of the light guide, wherein the recess comprises a second reflective surface, a third reflective surface, an inner output surface, and an inner binding surface, wherein the second reflective surface and the third reflective surface form the bottom surface of the recess, wherein the recess being situated between the first reflective surface and the output surface so that a part of the light rays reflected from the first reflective surface passes, before falling onto the output surface, through the recess, wherein the second reflective surface and the third reflective surface being configured to reflect light rays falling onto them to the lateral reflective surfaces configured to reflect light rays in the direction towards the output surface, wherein the inner output surface is configured to allow the entry of light rays into the recess and serve as a temporary exit of the light rays from the light guide, wherein the inner binding surface is configured to ensure re-entry of the light rays from the recess to the light guide, and wherein the first reflective surface, the second reflective surface, and the third reflective surface have the shape of approximate paraboloids.

* * * * *